(12) United States Patent
Hosokai et al.

(10) Patent No.: US 9,162,300 B2
(45) Date of Patent: Oct. 20, 2015

(54) METHOD FOR POLISHING BALL SCREW AND BALL SCREW POLISHING APPARATUS

(71) Applicants: SANSHIN CO., LTD., Nagaoka-shi, Niigata (JP); I.D.O CO., LTD., Higashiosaka-shi, Osaka (JP)

(72) Inventors: Nobukazu Hosokai, Nagaoka (JP); Mikio Yoshino, Nagaoka (JP); Takayuki Adachi, Nagaoka (JP)

(73) Assignees: SANSHIN CO., LTD., Niigata (JP); I.D.O CO., LTD., Osaka (JP)

( * ) Notice: Subject to any disclaimer, the term of this patent is extended or adjusted under 35 U.S.C. 154(b) by 0 days.

(21) Appl. No.: 14/461,814

(22) Filed: Aug. 18, 2014

(65) Prior Publication Data

US 2015/0056893 A1 Feb. 26, 2015

(30) Foreign Application Priority Data

Aug. 20, 2013 (JP) .................. 2013-170241
Jul. 3, 2014 (JP) .................. 2014-137526

(51) Int. Cl.
*B23G 9/00* (2006.01)
*B24B 21/22* (2006.01)
*B24B 21/16* (2006.01)

(52) U.S. Cl.
CPC ................ *B23G 9/004* (2013.01); *B24B 21/16* (2013.01); *B24B 21/22* (2013.01)

(58) Field of Classification Search
CPC ......... B23G 9/004; B23G 21/22; B23G 21/16
See application file for complete search history.

(56) References Cited

U.S. PATENT DOCUMENTS

| | | | | |
|---|---|---|---|---|
| 3,461,614 | A * | 8/1969 | Neubarth | 451/147 |
| 3,505,763 | A * | 4/1970 | Bassoff | 451/147 |
| 6,217,409 | B1 * | 4/2001 | Stadtfeld et al. | 451/5 |
| 6,386,953 | B1 * | 5/2002 | Wirz | 451/47 |

FOREIGN PATENT DOCUMENTS

JP  A-2006-22848  1/2006

* cited by examiner

*Primary Examiner* — Dung Van Nguyen
(74) *Attorney, Agent, or Firm* — Oliff PLC

(57) ABSTRACT

A method for polishing a ball screw comprising a screw shaft defining a screw axis. The screw shaft is formed with a screw groove. The method comprises the steps of: rotating the screw shaft at a rotational speed about the screw axis; conveying a polishing tape having a polishing portion traveled around an outer peripheral surface of a pressing roller, the press roller being configured to rotate about a rotational axis; guiding the polishing tape such that the polishing portion is traveled around the outer peripheral surface; pressing the polishing portion against the screw groove; tilting the pressing roller such that the rotational axis is aligned with a lead angle; oscillating the pressing roller linearly along the rotational axis; moving the polishing tape at a moving speed in a direction parallel to the screw axis; and synchronizing the rotational speed with the moving speed based on a lead.

7 Claims, 20 Drawing Sheets

METHOD FOR POLISHING BALL SCREW AND BALL SCREW POLISHING APPARATUS

CROSS REFERENCE TO RELATED APPLICATION

This application claims priority from Japanese Patent Application No. 2013-170241 filed Aug. 20, 2013 and Japanese Patent Application No. 2014-137526 filed Jul. 3, 2014. The entire contents of these priority applications are incorporated herein by reference.

TECHNICAL FIELD

The present invention relates to a ball screw polishing apparatus and a method for polishing a ball screw using a polishing tape to polish a screw groove formed in a shaft of the ball screw.

BACKGROUND

A ball screw is typically configured of a threaded shaft formed with a screw groove, a plurality of balls provided in the screw groove, and a nut rotatable relative to the shaft. In order to reduce friction among the balls, the screw groove, and the nut, a ball screw polishing apparatus may be used to improve the surface finish of the screw groove of the shaft.

One type of ball screw polishing apparatus known in the art (Japanese unexamined patent application publication No. 2006-22848) improves the surface finish of the screw groove in the shaft of the ball screw by buffing the surface of the screw groove with a buffing brush.

SUMMARY

However, the conventional structure of the ball screw polishing apparatus does not always produce suitable surface roughness in the screw groove of the screw shaft along which the balls roll.

In view of the foregoing, it is an object of the present invention to provide an apparatus and a method for improving a surface roughness in a screw groove formed in a screw shaft of a ball screw.

In order to attain the above and other objects, the invention provides a method for polishing a ball screw comprising a screw shaft defining a screw axis. The screw shaft is formed with a screw groove having a lead and a lead angle. The method includes the steps of: holding the screw shaft rotatably; rotating the screw shaft at a rotational speed about the screw axis; conveying a polishing tape continuously or intermittently, the polishing tape having a polishing portion traveled around an outer peripheral surface of a pressing roller, the press roller being configured to rotate about a rotational axis; guiding the polishing tape such that the polishing portion is traveled around the outer peripheral surface; pressing the polishing portion against the screw groove; tilting the pressing roller such that the rotational axis is aligned with the lead angle; oscillating the pressing roller linearly along the rotational axis; moving the polishing tape at a moving speed in a direction parallel to the screw axis; and synchronizing the rotational speed with the moving speed based on the lead.

According to another aspect, the present invention provides a ball screw polishing apparatus for polishing a ball screw comprising a screw shaft defining a screw axis. The screw shaft is formed with a screw groove having a lead and a lead angle. The ball screw polishing apparatus includes a holding mechanism, a rotating mechanism, a pressing roller, a tape-conveying mechanism, a tape-pressing mechanism, a tilting mechanism, a linear oscillating mechanism, a moving mechanism, and a speed-synchronizing mechanism. The holding mechanism is configured to rotatably hold the screw shaft. The rotating mechanism is configured to rotate the screw shaft at a rotational speed about the screw axis. The pressing roller is configured to rotate about a rotational axis and has an outer peripheral surface. The tape-conveying mechanism is configured to continuously or intermittently convey a polishing tape. The polishing tape having a polishing portion traveled around the outer peripheral surface. The tape-pressing mechanism is configured to guide the polishing tape such that the polishing portion is traveled around the outer peripheral surface and press the polishing portion against the screw groove. The tilting mechanism is configured to tilt the pressing roller such that the rotational axis is aligned with the lead angle. The linear oscillating mechanism is configured to linearly oscillate the pressing roller along the rotational axis. The moving mechanism is configured to move the polishing tape at a moving speed in a direction parallel to the screw axis. The speed-synchronizing mechanism is configured to synchronize the rotational speed with the moving speed based on the lead.

BRIEF DESCRIPTION OF THE DRAWINGS

The particular features and advantages of the invention as well as other objects will become apparent from the following description taken in connection with the accompanying drawings, in which.

DETAILED DESCRIPTION

FIGS. 1 through 22 illustrate preferred embodiments of the present invention. FIGS. 1 through 11 illustrate a first embodiment, while FIGS. 12 through 22 illustrate a second embodiment.

Figure 4:
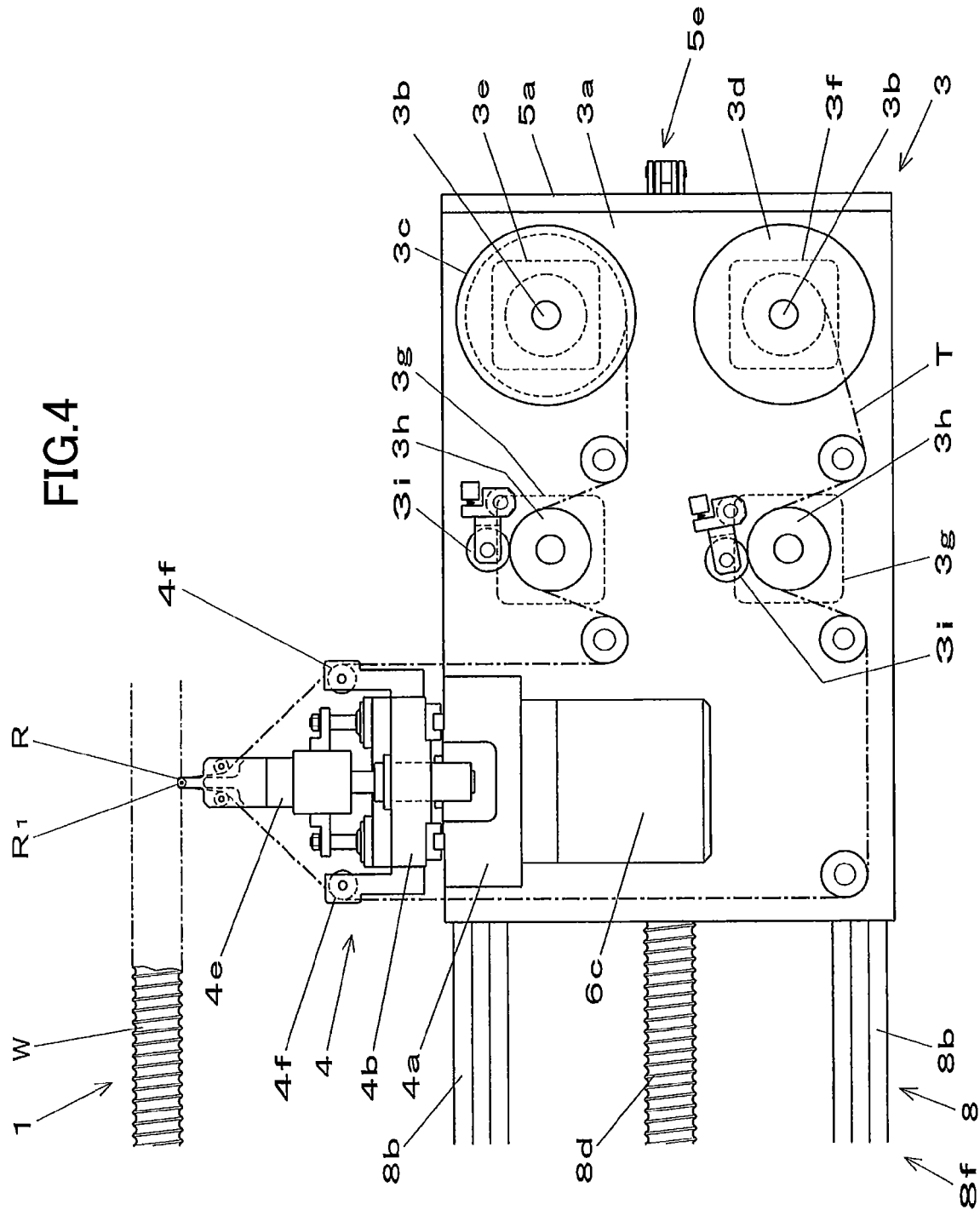
FIG. 4 is an enlarged partial plan view of the ball screw polishing apparatus according to the first embodiment of the present invention.
Figure 5:
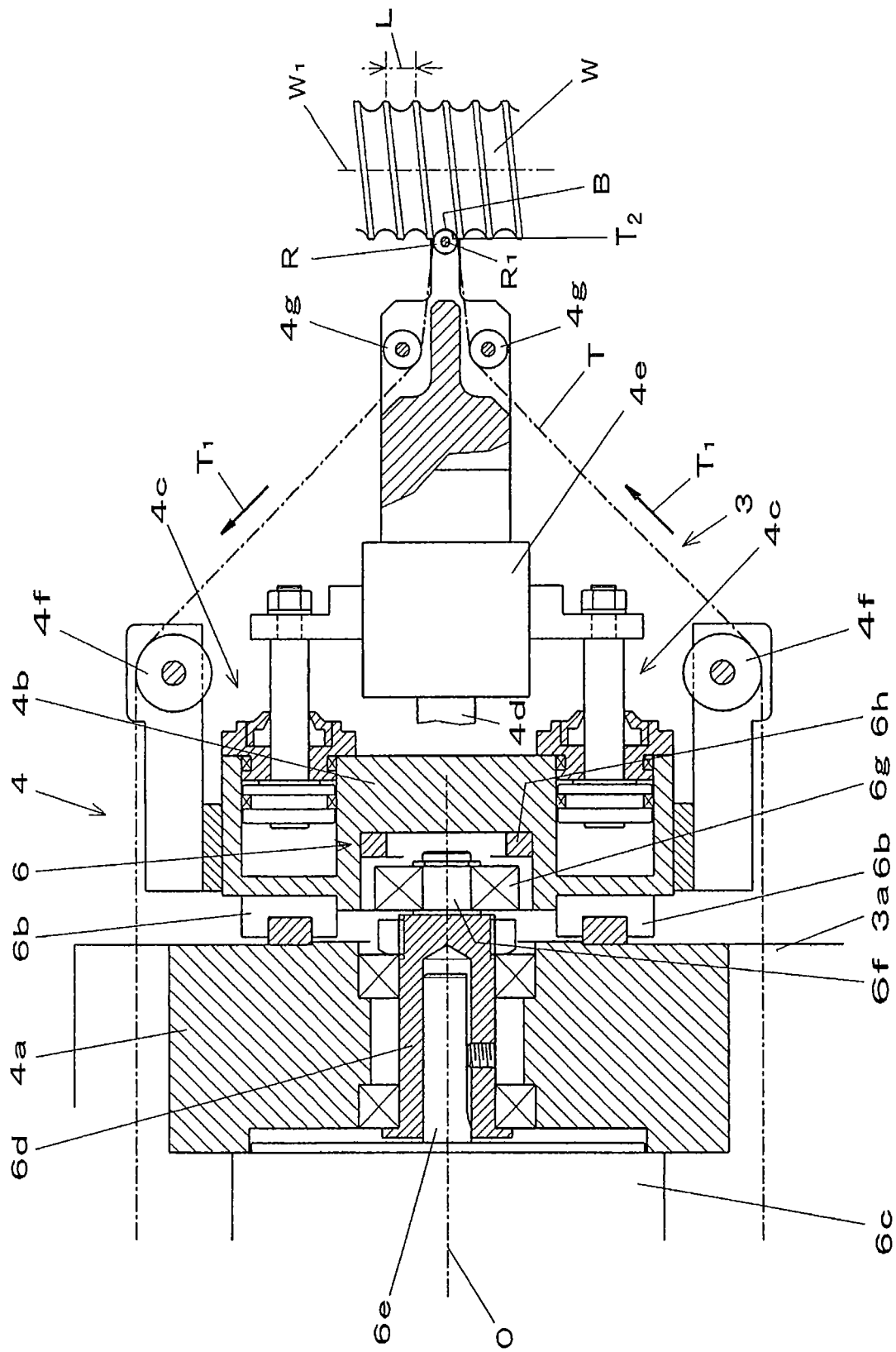
FIG. 5 is an enlarged cross-sectional plan view of the ball screw polishing apparatus according to the first embodiment of the present invention.

As shown in FIGS. 1, 2, 3, 4, 5, and 9, a ball screw polishing apparatus is configured to polish a ball screw including a screw shaft W, balls and a nut rotatable relative to the screw shaft W. The screw shaft W is formed with a screw groove B. The polishing apparatus for polishing the screw groove B according to the first embodiment is broadly configured of a holding mechanism 1, a rotating mechanism 2, a tape-conveying mechanism 3, a tape-pressing mechanism 4, a tilting mechanism 5, a linear oscillating mechanism 6, a moving mechanism 8, and a speed-synchronizing mechanism 9. The holding mechanism 1 is configured to rotatably hold the screw shaft W. The rotating mechanism 2 is configured to rotate the screw shaft W about a screw axis $W_1$ thereof. The tape-conveying mechanism 3 is configured to continuously or intermittently convey a polishing tape T along a conveying path $T_1$ as shown in FIG. 5. The tape-pressing mechanism 4 is configured to guide the polishing tape T to travel around an outer peripheral surface of a pressing roller R and configured to press the polishing tape T on the outer peripheral surface of the pressing roller R against the screw groove B. The tilting mechanism 5 is configured to tilt the pressing roller R such that a rotational axis $R_1$ of the pressing roller R corresponds to a lead angle θ of the screw groove B. The linear oscillating mechanism 6 is configured to oscillate the pressing roller R linearly in reciprocal directions Y parallel to the rotational axis $R_1$. The moving mechanism 8 is configured to move the polishing tape T traveled around the pressing roller R in a direction parallel to the screw axis $W_1$ of the screw shaft W.

The speed-synchronizing mechanism 9 is configured to synchronize a rotational speed Q of the screw shaft W with a moving speed F of the polishing tape T in the direction parallel to the screw axis $W_1$ based on a lead L of the screw groove B (where the lead L is a distance in which the nut will advance along the screw axis $W_1$ of the screw shaft W when the screw shaft W rotates one turn).

Figure 1:
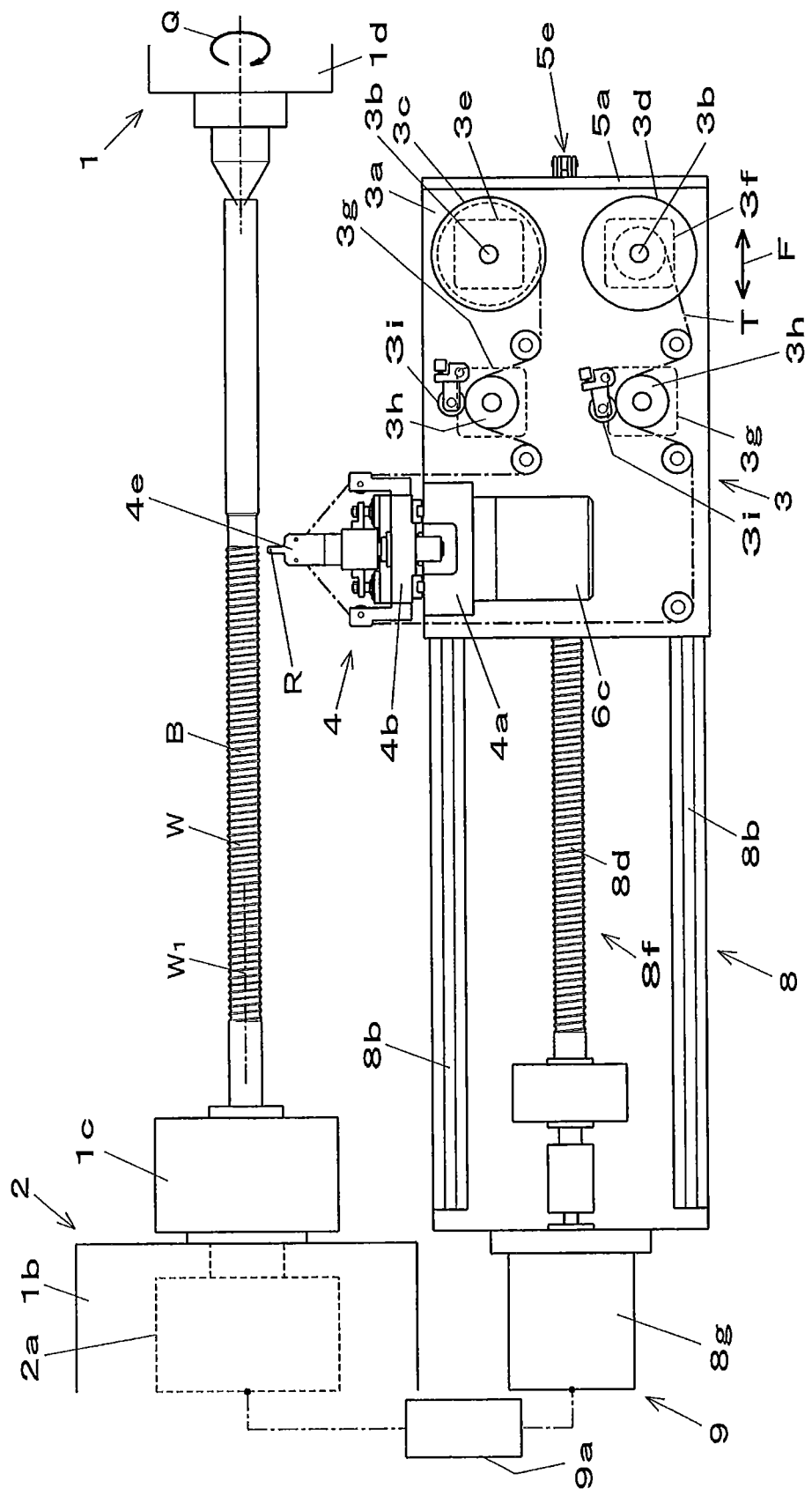
FIG. 1 is a plan view showing an overall structure of a ball screw polishing apparatus according to a first embodiment of the present invention.
Figure 2:
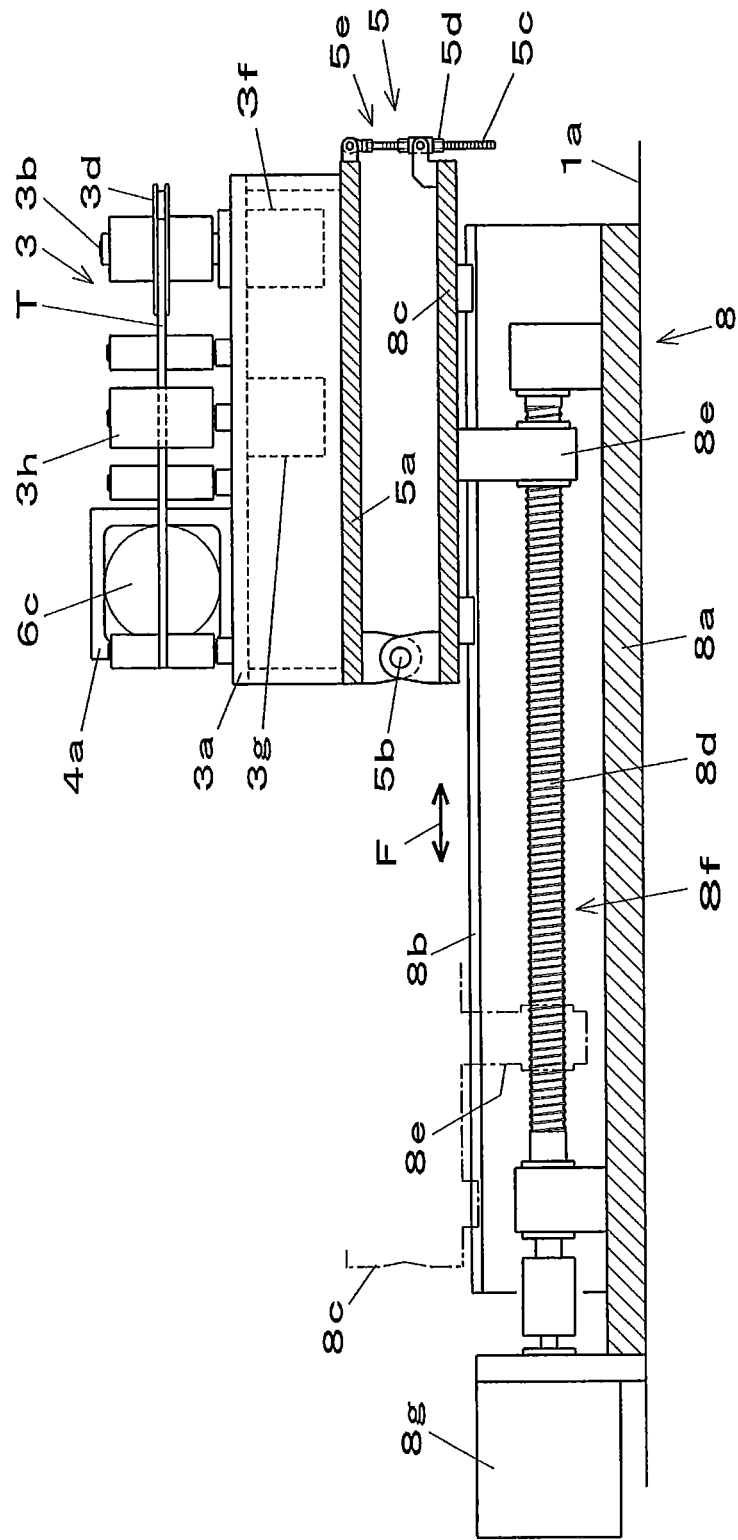
FIG. 2 is a front view showing an overall structure of the ball screw polishing apparatus according to the first embodiment of the present invention.
Figure 3:
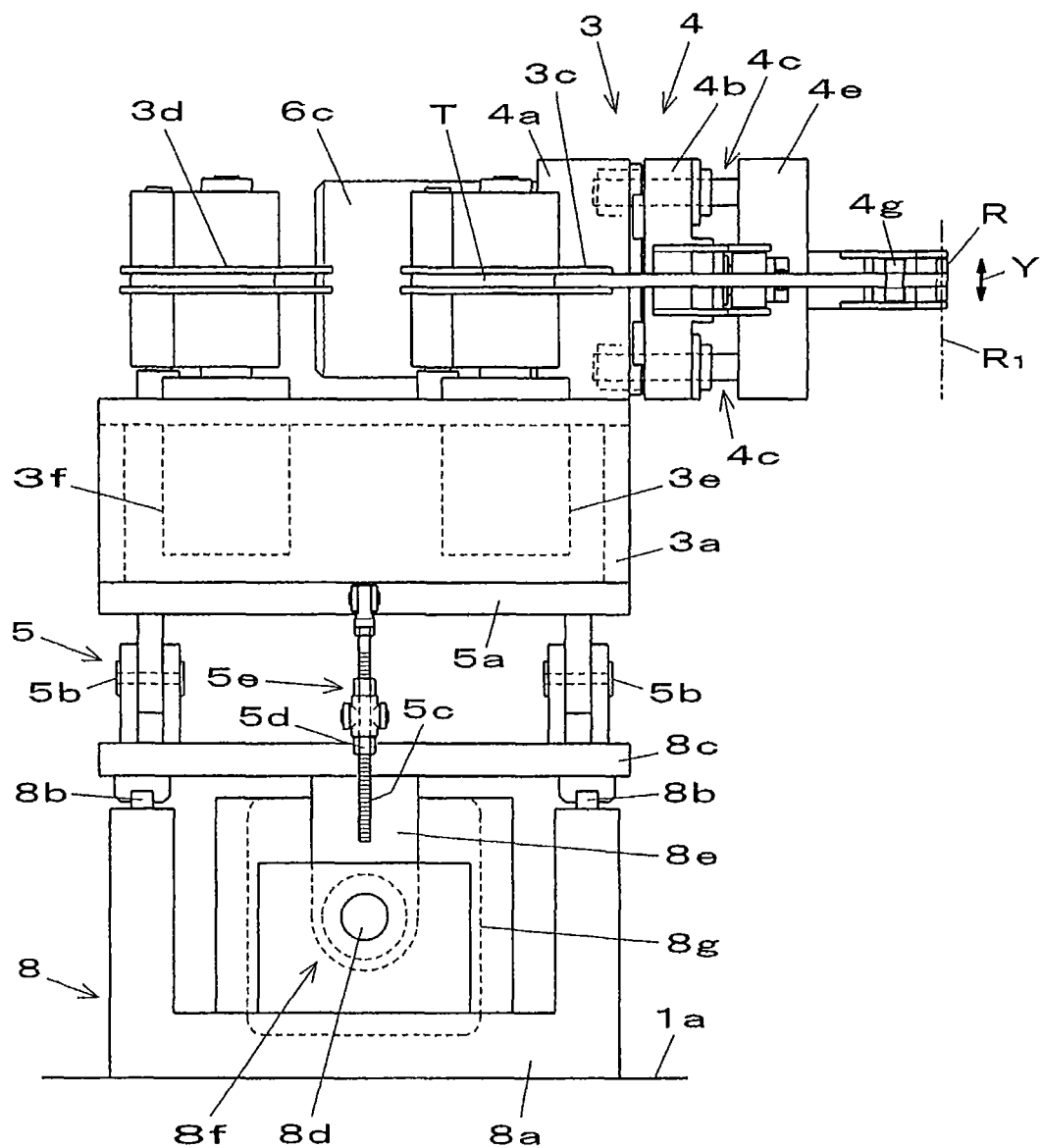
FIG. 3 is a partial side view of the ball screw polishing apparatus according to the first embodiment of the present invention.

As shown in FIGS. 1 and 2, the holding mechanism 1 of the ball screw polishing apparatus described above includes a body 1a, a holding base 1b, a chuck 1c, and a center-pressing base 1d. The holding base 1b is erected on the body 1a. The chuck 1c is provided on the holding base 1b. The chuck 1c is adapted to detachably hold one end of the screw shaft W, while the center-pressing base 1d is adapted to rotatably hold the other end of the screw shaft W.

As shown in FIG. 1, the rotating mechanism 2 of the ball screw polishing apparatus described above includes a rotation control motor 2a (as an example of a first motor). The rotation control motor 2a rotates the chuck 1c (the screw shaft W) at the rotational speed Q, which in turn rotates the screw shaft W about the screw axis $W_1$.

Figure 6:
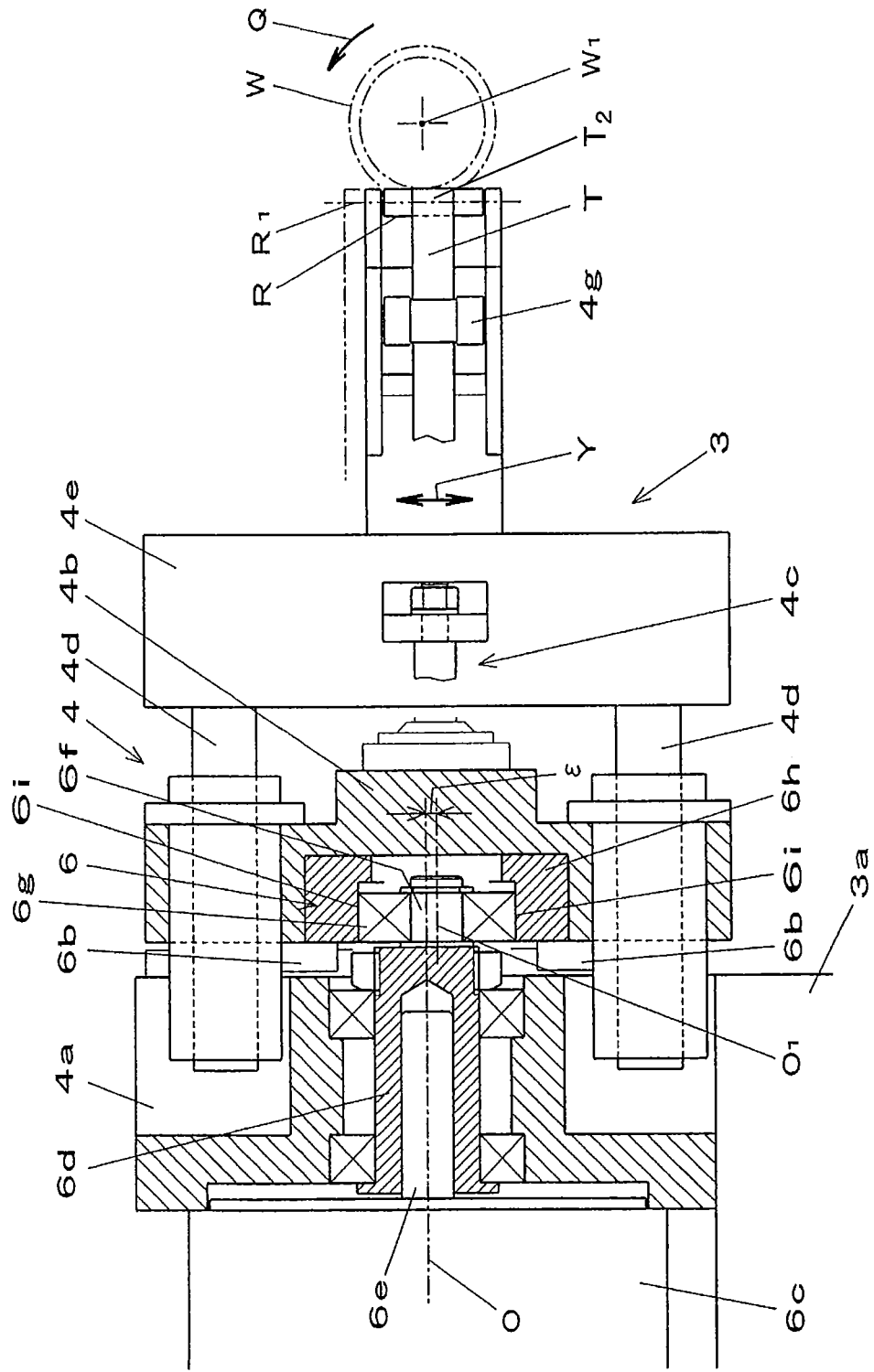
FIG. 6 is an enlarged cross-sectional side view of the ball screw polishing apparatus according to the first embodiment of the present invention.

As shown in FIGS. 1, 2, 3, 4, and 5, the tape-conveying mechanism 3 of the ball screw polishing apparatus described above includes a mounting base 3a, a pair of support shafts 3b, a loaded reel 3c, an empty reel 3d, a payout motor 3e, a take-up motor 3f, a pair of conveying motors 3g, a pair of conveying rollers 3h, and a pair of pinch rollers 3i. The support shafts 3b are disposed on the mounting base 3a. The loaded reel 3c and the empty reel 3d are rotatably mounted on respective support shafts 3b. The loaded reel 3c is wound with unused polishing tape T to be paid out, while the empty reel 3d is a to rewind the used polishing tape T. The polishing tape T paid out from the loaded reel 3c passes around the outer peripheral surface of the pressing roller R on the tape-pressing mechanism 4 and then is taken up by the empty reel 3d. The payout motor 3e rotates the loaded reel 3c to let out polishing tape T from the loaded reel 3c, while the take-up motor 3f rotates the empty reel 3d to wind the polishing tape T on the empty reel 3d. The conveying motors 3g rotate respective conveying rollers 3h for conveying the polishing tape T between the loaded reel 3c and the pressing roller R and between the pressing roller R and the empty reel 3d. The polishing tape T has a polishing portion $T_2$ traveled around the pressing roller R as shown in FIGS. 5 and 6. That is, the screw groove B is polished by the polishing portion $T_2$ of the polishing tape T which is intermittently or continuously conveyed by the tape-conveying mechanism 3. The pinch rollers 3i are disposed in confrontation with respective conveying rollers 3h for pressing the polishing tape T against the conveying rollers 3h. Through the associated operations of the payout motor 3e, the take-up motor 3f, and the conveying motors 3g, the tape-conveying mechanism 3 conveys polishing tape T either continuously or intermittently at a relatively slow speed along the conveying path $T_1$ from the loaded reel 3c, around the pressing roller R, and to the empty reel 3d.

As shown in FIGS. 4 and 5, the tape-pressing mechanism 4 of the ball screw polishing apparatus described above includes a mount 4a, a pressing base 4b, a pair of left and right cylindrical mechanisms 4c, a pair of guide shafts 4d, an advancing/retracting member 4e, a pair of left and right guide rollers 4f, and a pair of left and right guide rollers 4g. The mount 4a is erected on the mounting base 3a described above. The pressing base 4b is connected to the mount 4a, with the linear oscillating mechanism 6 described above interposed therebetween. Each of the cylindrical mechanisms 4c is laterally arranged with a gap therebetween as shown in FIG. 5, and each of the guide shafts 4d is vertically arranged with a gap therebetween as shown in FIG. 6. The advancing/retracting member 4e is connected to the pressing base 4b via the cylindrical mechanisms 4c and the guide shafts 4d. The guide rollers 4f are provided on the pressing base 4b, and the guide rollers 4g are provided on the advancing/retracting member 4e. The pressing roller R described above is disposed in a position rearward (the screw shaft W side) and between the left and right guide rollers 4g. The guide rollers 4f, the guide rollers 4g, and the pressing roller R are configured to guide the polishing tape T as the polishing tape T moves from the tape-conveying mechanism 3, around the pressing roller R, and then back to the tape-conveying mechanism 3 while the cylindrical mechanisms 4c presses the polishing tape T on the outer peripheral surface of the pressing roller R against the screw groove B formed in the screw shaft W.

The polishing tape T of the preferred embodiment is configured of a base material coated with abrasive particles of a prescribed size or has such particles bonded to the surface thereof. The base material may be formed of polyester film, metal, cloth or the like, for example. The abrasive particles may be formed of aluminum oxide, chromium oxide, silicon carbide, diamond or the like, for example.

Figure 7:
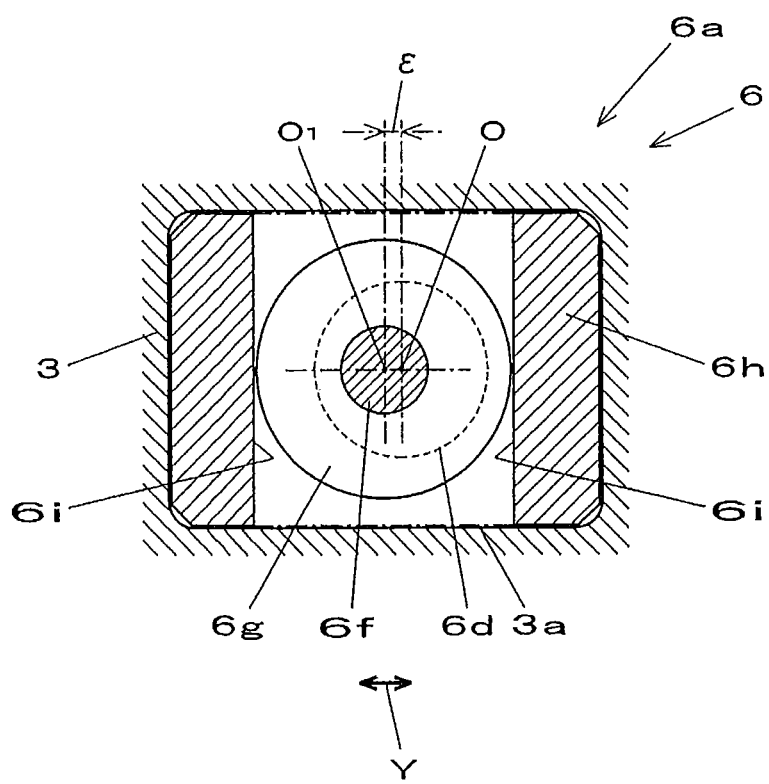
FIG. 7 is an enlarged cross-sectional rear view showing a linear oscillating mechanism of the ball screw polishing apparatus according to the first embodiment of the present invention.
Figure 8:
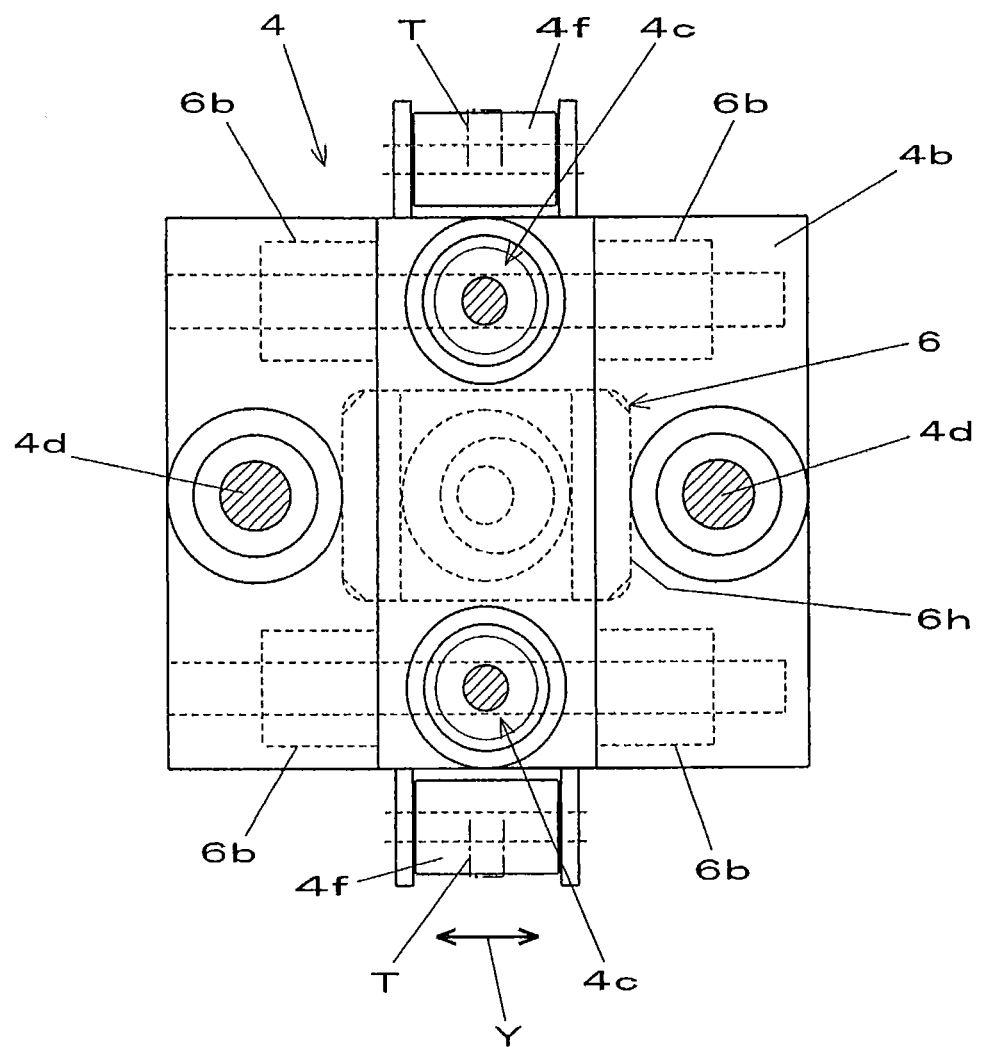
FIG. 8 is an enlarged cross-sectional rear view showing a tape-pressing mechanism of the ball screw polishing apparatus according to the first embodiment of the present invention.

As shown in FIGS. 5, 6, 7, and 8, the linear oscillating mechanism 6 in the ball screw polishing apparatus described above includes an eccentric mechanism 6a as shown in FIG. 7, sliding parts 6b, a linear oscillation motor 6c, and a shaft cylinder 6d. The eccentric mechanism 6a further includes an eccentric shaft part 6f, an eccentric wheel 6g, and a steel member 6h. The pressing base 4b is slidably disposed on the mount 4a through the sliding parts 6b and, through the operation of the eccentric mechanism 6a, can slidingly oscillate in a vertical direction crossing the screw axis $W_1$ of the screw shaft W. The linear oscillation motor 6c is mounted on the mount 4a and has a main shaft 6e rotating about a rotational axis O. The shaft cylinder 6d is rotatably supported on the mount 4a. The main shaft 6e of the linear oscillation motor 6c is mounted in the shaft cylinder 6d. The eccentric shaft part 6f is formed on the shaft cylinder 6d. The eccentric shaft part 6f has an eccentric axis $O_1$ having an eccentricity ϵ relative to the rotational axis O of the main shaft 6e as shown in FIG. 6. The eccentric wheel 6g has a ball bearing structure that allows the eccentric shaft part 6f to be rotatable relative to the steel member 6h. As shown in FIG. 7, the steel member 6h is provided in the pressing base 4b and formed with a groove extending laterally and passing through the entire center region thereof so as to form flange-like parts on either side of the groove. The flange-like parts have inner surfaces as opposing contact surfaces 6i for contacting the eccentric wheel 6g. Specifically, the eccentric wheel 6g has a diameter substantially the same as a distance between the contact surfaces 6i while the diameter of the eccentric wheel 6g is smaller than a width of the steel member 6h in a direction orthogonal to the directions Y, allowing the linear oscillating mechanism 6 to oscillate in the directions Y, i.e., in the vertical direction. When driven by the linear oscillation motor 6c, the eccentric shaft part 6f, the eccentric wheel 6g, the contact surfaces 6i of the steel member 6h, and the sliding parts 6b are configured to oscillate the pressing roller R linearly in the directions Y parallel to the rotational axis $R_1$.

As shown in FIGS. 1 and 2, the moving mechanism 8 of the ball screw polishing apparatus described above includes a stationary base 8a, rails 8b, a sliding plate 8c, a ball screw mechanism 8f, and a movement control motor 8g (as an example of a second motor). The stationary base 8a is disposed on the body 1a. The rails 8b are vertically in confrontation with the stationary base 8a and extend along the ball screw mechanism 8f. The sliding plate 8c is disposed on the rails 8b and slidingly movable on the rails 8b in a direction parallel to the screw axis $W_1$ of the screw shaft W. The mounting base 3a of the tape-conveying mechanism 3 is disposed on the sliding plate 8c with the tilting mechanism 5 interposed therebetween. The ball screw mechanism 8f includes a screw shaft 8d, and a nut 8e provided on the screw shaft 8d. Through the ball screw mechanism 8f, the movement control motor 8g moves the sliding plate 8c and consequently the polishing tape T at the moving speed F in a direction parallel to the screw axis $W_1$ of the screw shaft W.

Figure 9:
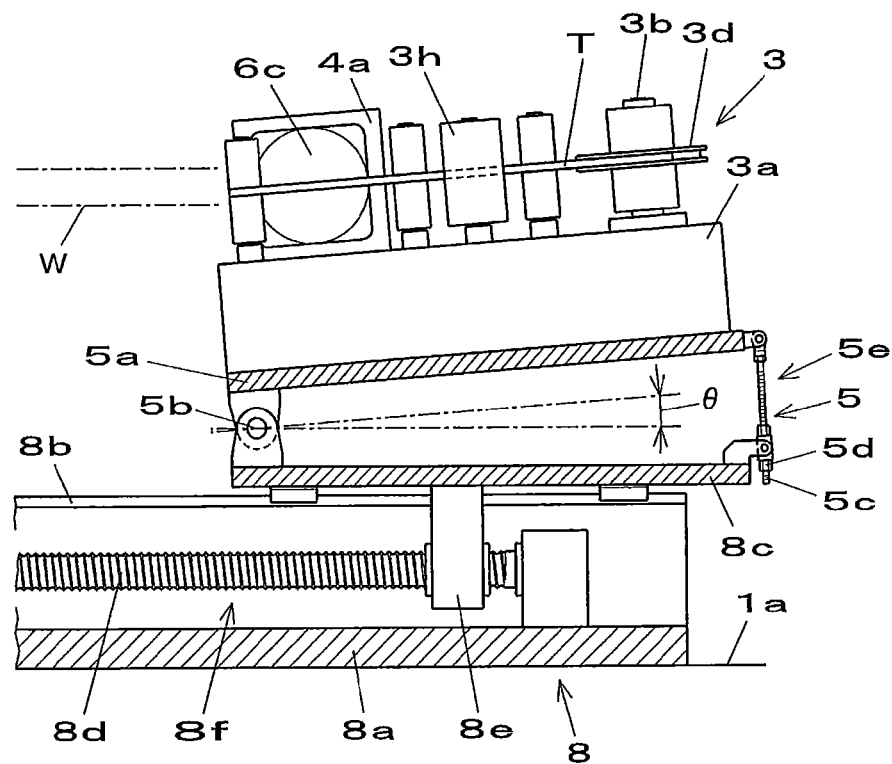
FIG. 9 is a partial cross-sectional front view of the ball screw polishing apparatus according to the first embodiment of the present invention.
Figure 10:
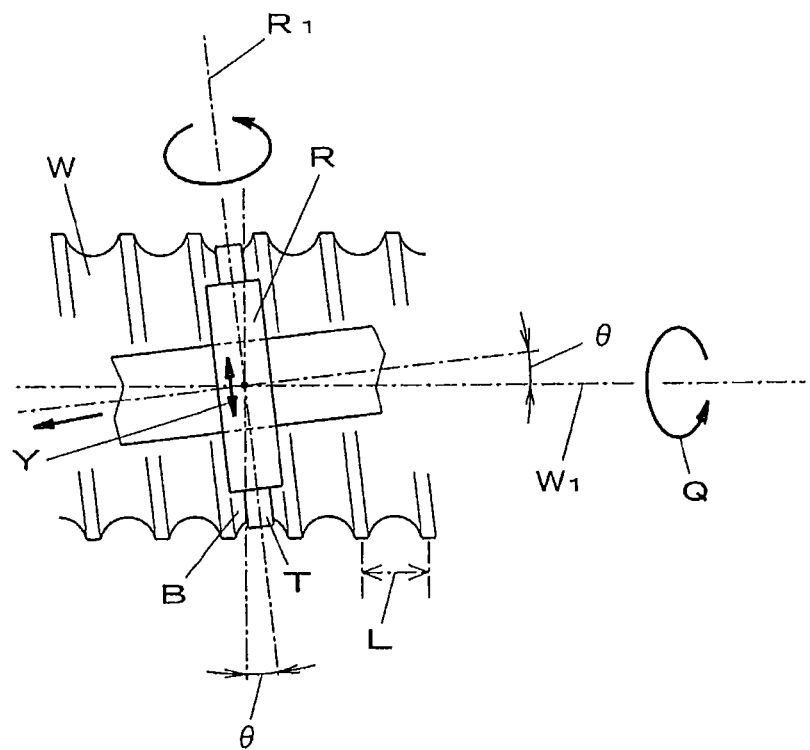
FIG. 10 is an enlarged partial front view illustrating a polishing mechanism of the ball screw polishing apparatus according to the first embodiment of the present invention.
Figure 11:
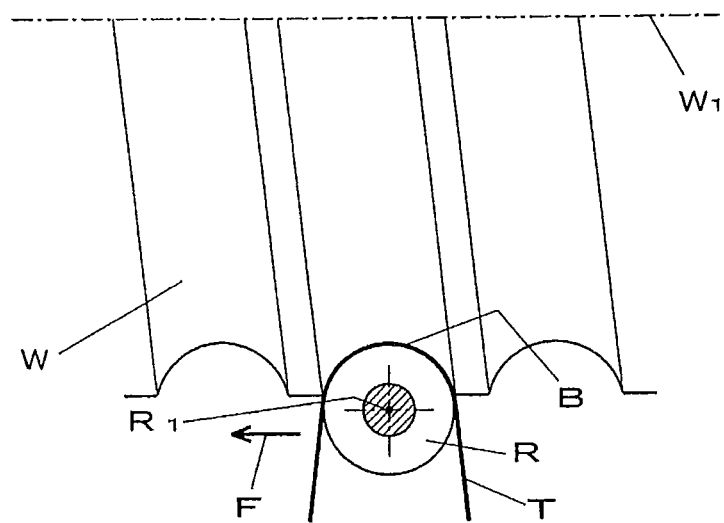
FIG. 11 is an enlarged partial plan view illustrating the polishing mechanism of the ball screw polishing apparatus according to the first embodiment of the present invention.

As shown in FIGS. 1, 2, 9, and 10, the tilting mechanism 5 includes a tilting base 5a, a pivot shaft 5b, and a position-fixing mechanism 5e. The tilting base 5a is pivotably disposed on the sliding plate 8c by the pivot shaft 5b, enabling the tilting base 5a to be tilted relative to the screw axis $W_1$ of the screw shaft W. The position-fixing mechanism 5e further includes a connecting screw 5c and a fixing nut 5d each disposed on the opposite side of the tilting base 5a from the pivot shaft 5b for fixing the tilting base 5a in the tilted position thereof, that is, the tilting base 5a has a one end portion provided with the position-fixing mechanism 5e and the other end portion provided with the pivot shaft 5b as shown in FIG. 9. The pressing roller R is disposed on the tilting base 5a through the tape-conveying mechanism 3 and tape-pressing mechanism 4. The tilting mechanism 5 is configured to tilt the pressing roller R such that the rotational axis $R_1$ of the pressing roller R corresponds to the lead angle θ of the screw groove B, as shown in FIGS. 9 and 10. That is, the tilting mechanism 5 tilts the pressing roller R such that the rotational axis $R_1$ is in alignment with the lead angle θ, efficiently polishing the screw groove B by the polishing portion $T_2$. The lead angle θ is defined by a vertical straight line and a straight line along the screw groove B.

The speed-synchronizing mechanism 9 includes the rotation control motor 2a that rotates the screw shaft W, the movement control motor 8g that moves the polishing tape T, i.e., the movement control motor 8g moves the tape-conveying mechanism 3 along with the tilting mechanism 5 so as to move the polishing tape T in a direction parallel to the screw axis $W_1$ by rotating the screw shaft 8d, and a synchronization control unit 9a adapted to synchronize the rotational speed Q of the rotation control motor 2a with the rotational speed of the movement control motor 8g. While a detailed circuit structure and the like for the synchronization control unit 9a has been omitted from the drawings, the synchronization control unit 9a may be a personal computer and the like, for example, for synchronizing the rotational speed Q of the screw shaft W with the moving speed F of the polishing tape T based on the lead L of the screw groove B. That is, the synchronization control unit 9a is adapted to control the rotation control motor 2a and the movement control motor 8a such that the polishing tape T on the pressing roller R moves at the moving speed F along the screw groove B in a direction parallel to the screw axis $W_1$ while rotating the screw shaft W at the rotational speed Q. Specifically, the synchronizing mechanism 9 synchronizes the rotational speed of the rotation control motor 2a with the rotational speed of the movement control motor 8g.

Next, the polishing operation will be described. With the ball screw polishing apparatus according to the first embodiment described above, and as shown in FIGS. 1, 2, 5, 10, and 11, the holding mechanism 1 rotatably holds the screw shaft W of the ball screw, while the rotating mechanism 2 rotates the screw shaft W about the screw axis $W_1$ at the rotational speed Q. At this time, the tape-conveying mechanism 3 conveys the polishing tape T along the conveying path $T_1$. The tape-pressing mechanism 4 guides the polishing tape T out from the tape-conveying mechanism 3, around the peripheral surface of the pressing roller R, and back to the tape-conveying mechanism 3 while pressing the polishing tape T on the outer peripheral surface of the pressing roller R against the screw groove B formed in the screw shaft W. The tilting mechanism 5 holds the pressing roller R in a tilted state such that the rotational axis $R_1$ of the pressing roller R is aligned with the lead angle θ of the screw groove B. The linear oscillating mechanism 6 oscillates the pressing roller R together with the polishing tape T thereon linearly in the directions Y parallel to the rotational axis $R_1$. The moving mechanism 8 moves the polishing tape T in a direction parallel to the screw axis $W_1$ of the screw shaft W at the moving speed F. The speed-synchronizing mechanism 9 synchronizes the rotational speed Q of the screw shaft W with the moving speed F of the polishing tape T based on the lead L of the screw groove B. In this way, the polishing tape T can polish the screw groove B through a combination of operations that include: rotation of the screw shaft W by the rotating mechanism 2; conveyance of the polishing tape T along the conveying path $T_1$ by the tape-conveying mechanism 3; linear oscillation of the polishing tape T in the directions Y by the linear oscillating mechanism 6; and linear movement of the polishing tape T by the moving mechanism 8 along the screw axis $W_1$ of the screw shaft W at the moving speed F synchronized with the rotational speed Q of the screw shaft W. By moving the polishing tape T along the screw axis $W_1$ in synchronization with the rotational speed Q of the screw shaft W, the movement of the polishing tape T matches the lead L of the screw groove B so that the tape-pressing mechanism 4 can reliably press the polishing tape T on the pressing roller R against the screw groove B and can reliably polish the screw groove B through continuous or intermittent conveyance along the conveying path $T_1$ and linear oscillation in the directions Y. Thus, the method and apparatus of the first embodiment can improve polishing precision, can reduce surface roughness in the screw groove B, and can improve polishing efficiency for the screw groove B.

Further, by using the eccentric mechanism 6a to oscillate the pressing roller R linearly in the directions Y aligned with the rotational axis $R_1$ of the pressing roller R, the structure of the linear oscillating mechanism 6 can be simplified. Further, by configuring the speed-synchronizing mechanism 9 of the rotation control motor 2a for rotating the screw shaft W, the movement control motor 8g for moving the polishing tape T along the screw axis $W_1$ of the screw shaft W, and the synchronization control unit 9a for controlling synchronization of the rotational speed Q of the rotation control motor 2a and the rotational speed of the movement control motor 8g, the speed-synchronizing mechanism 9 can synchronize the rotational speed Q of the screw shaft W with the moving speed F of the polishing tape T based on the lead L of the screw groove B. Thus, the above structure can match the movement of the polishing tape T with the lead L of the screw groove B so that the polishing tape T reliably contacts the screw groove B, while simplifying the structure of the ball screw polishing apparatus and improving the polishing precision.

Figure 13:
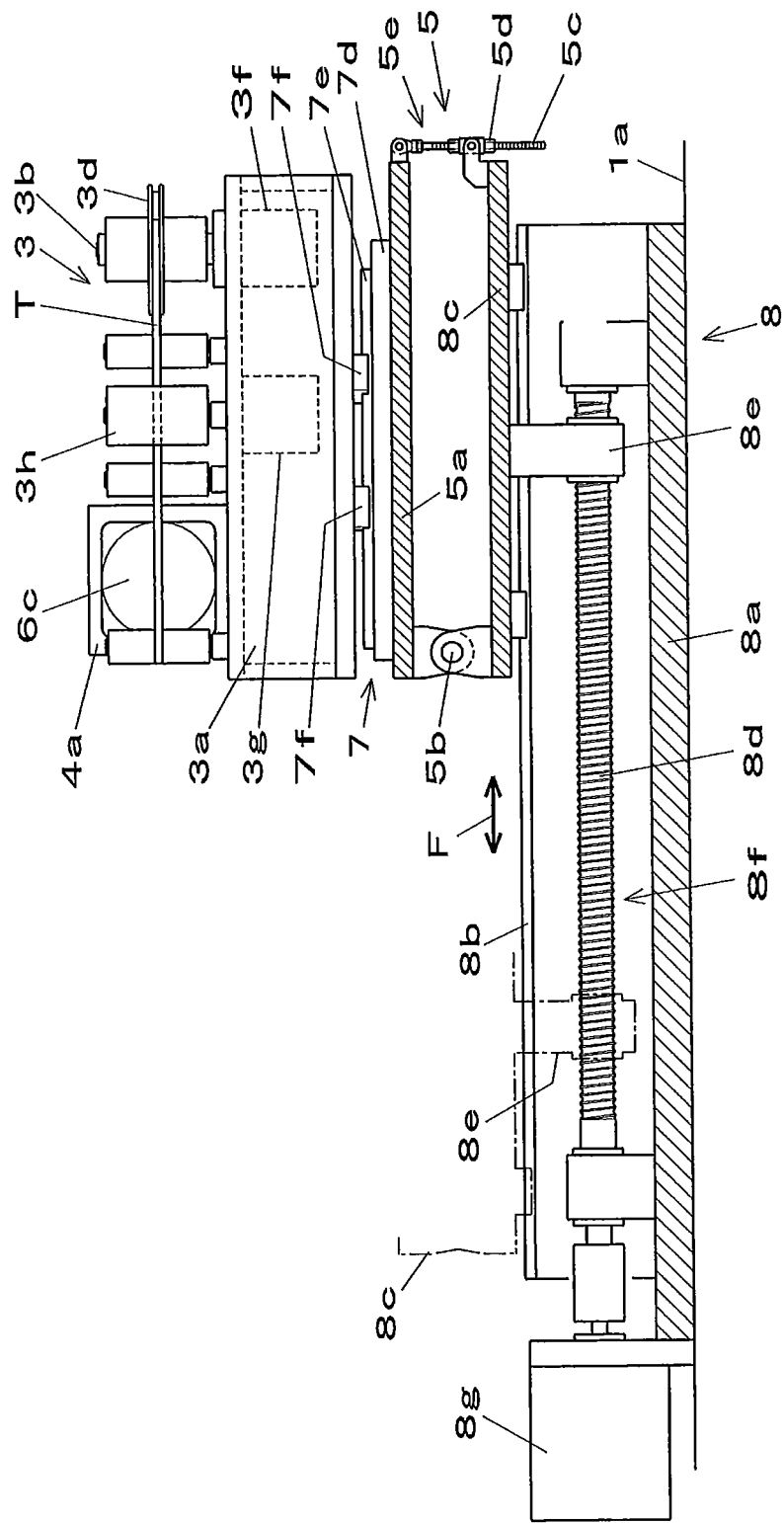
FIG. 13 is a front view showing an overall structure of the ball screw polishing apparatus according to the second embodiment of the present invention.
Figure 14:
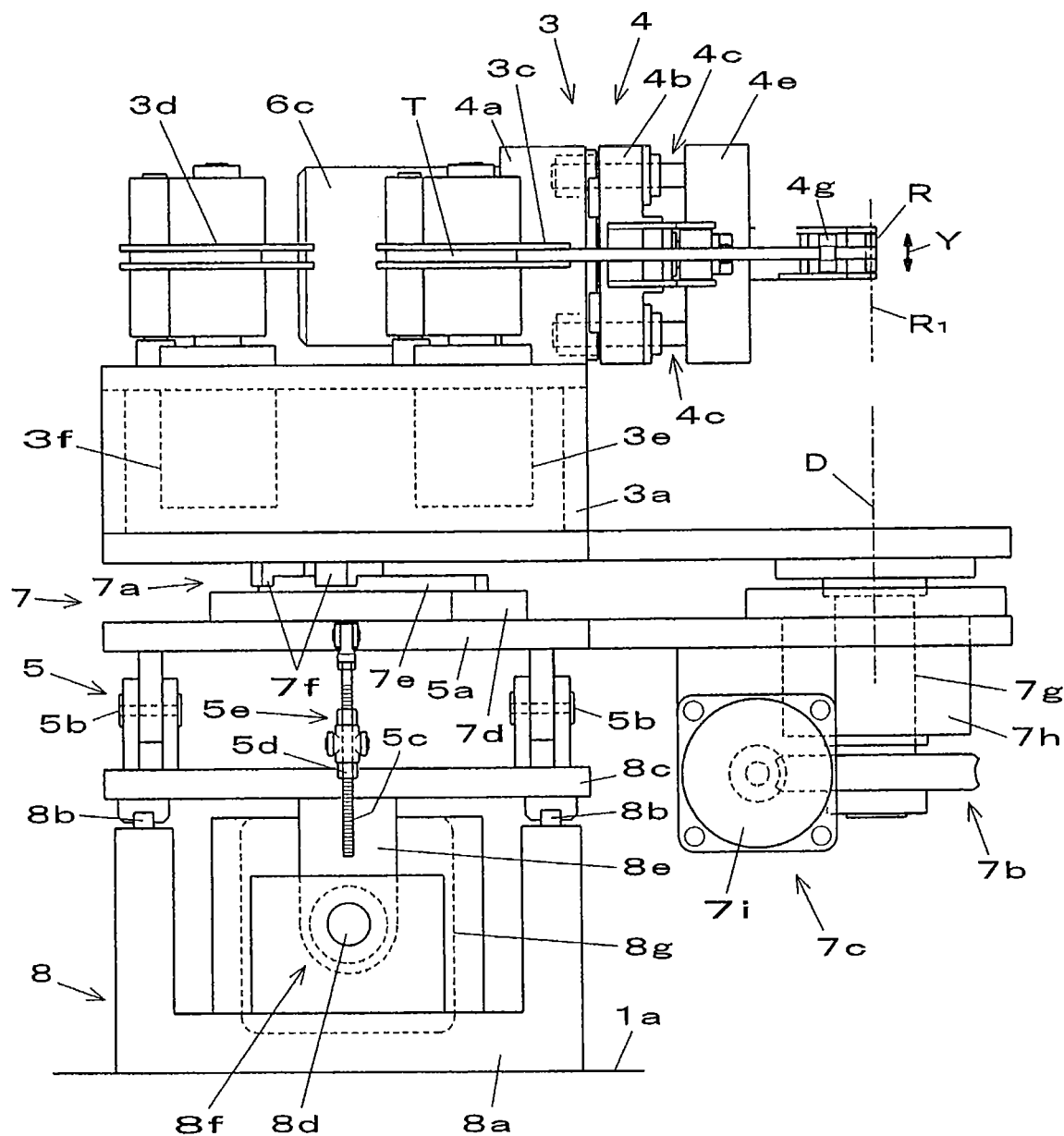
FIG. 14 is a partial side view of the ball screw polishing apparatus according to the second embodiment of the present invention.
Figure 15:
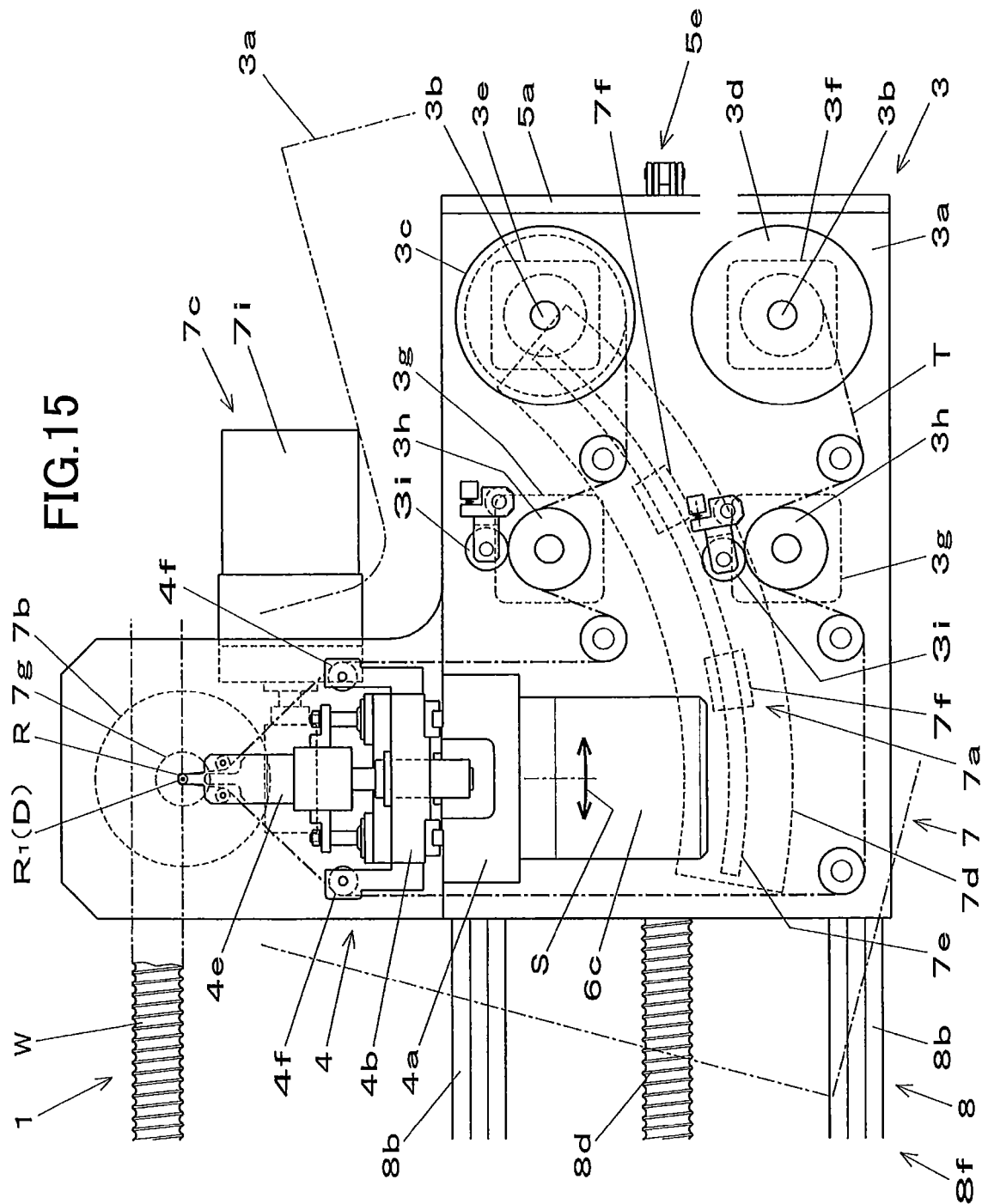
FIG. 15 is an enlarged partial plan view of the ball screw polishing apparatus according to the second embodiment of the present invention.
Figure 16:
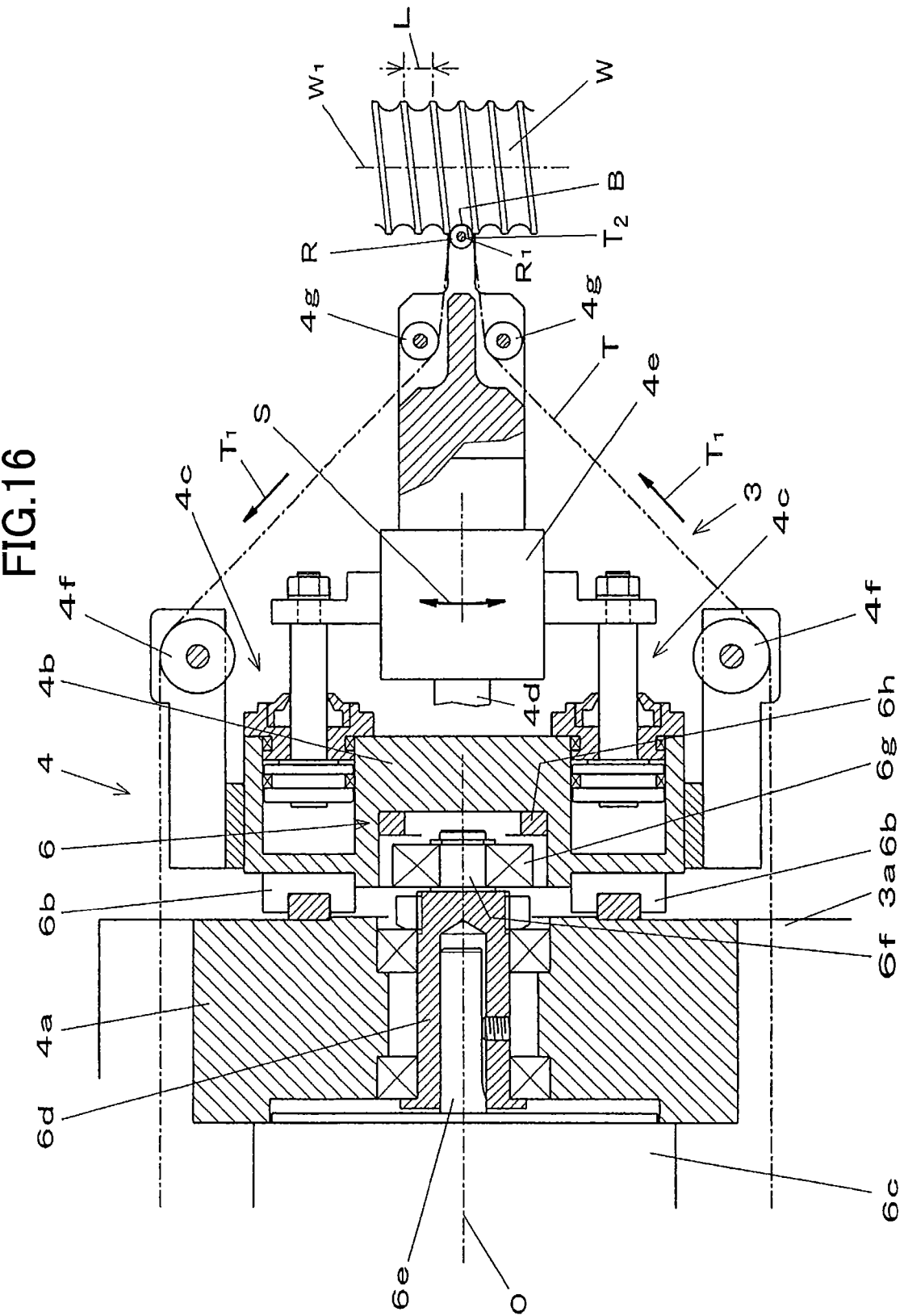
FIG. 16 is an enlarged cross-sectional plan view of the ball screw polishing apparatus according to the second embodiment of the present invention.

As shown in FIGS. 12, 13, 14, 15, 16, and 20, a ball screw polishing apparatus according to the second embodiment is configured to polish a ball screw including a screw shaft W, balls and a nut. The screw shaft W is formed with a screw groove B as a helical raceway. The ball screw polishing apparatus according to the second embodiment is broadly configured of a holding mechanism 1, a rotating mechanism 2, a tape-conveying mechanism 3, a tape-pressing mechanism 4, a tilting mechanism 5, a linear oscillating mechanism 6, a pivotal oscillating mechanism 7, a moving mechanism 8, and a speed-synchronizing mechanism 9. The holding mechanism 1 is configured to rotatably hold the screw shaft W of the ball screw. The rotating mechanism 2 is configured to rotate the screw shaft W about a screw axis $W_1$ thereof. The tape-conveying mechanism 3 is configured to continuously or intermittently convey a polishing tape T along a conveying path $T_1$ as shown in FIG. 16. The tape-pressing mechanism 4 is configured to guide the polishing tape T to travel around an outer peripheral surface of a pressing roller R and configured to press the polishing tape T on the outer peripheral surface of the pressing roller R against the screw groove B. The tilting mechanism 5 is configured to tilt the pressing roller R such that a rotational axis $R_1$ of the pressing roller R corresponds to a lead angle θ of the screw groove B. The linear oscillating mechanism 6 is configured to oscillate the pressing roller R linearly in reciprocal directions Y parallel to the rotational axis $R_1$. The pivotal oscillating mechanism 7 is configured to oscillate the pressing roller R about the rotational axis $R_1$ within an angular range S as shown in FIG. 15. The moving mechanism 8 is configured to move the polishing tape T traveled around the pressing roller R in a direction parallel to the screw axis $W_1$ of the screw shaft W. The speed-synchronizing mechanism 9 is configured to synchronize a rotational speed Q of the screw shaft W with a moving speed F of the polishing tape T based on a lead L of the screw groove B (where the lead L is the distance in which the nut will advance along the screw axis $W_1$ of the screw shaft W when the screw shaft W rotates one turn).

Figure 12:
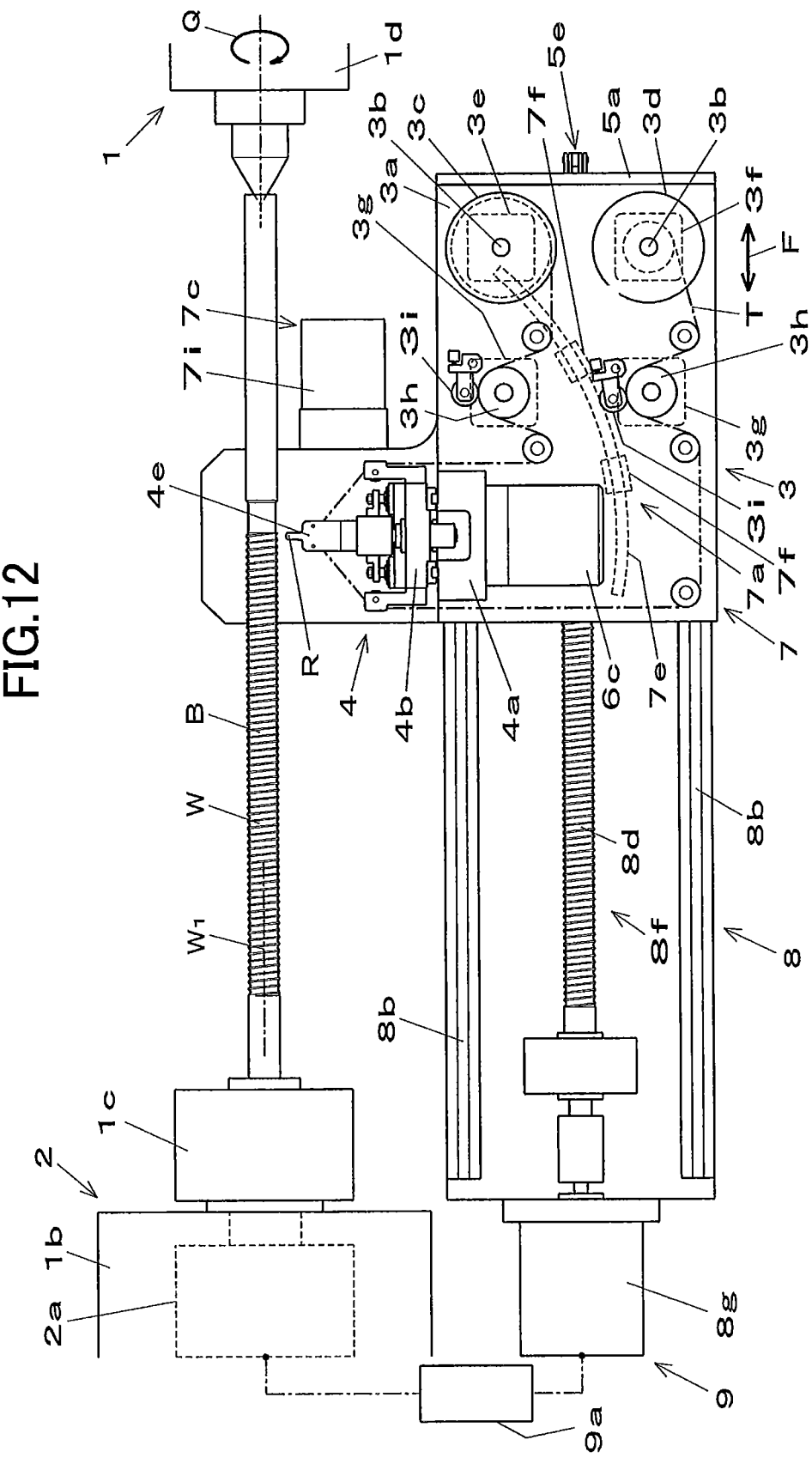
FIG. 12 is a plan view showing an overall structure of a ball screw polishing apparatus according to a second embodiment of the present invention.

As shown in FIGS. 12 and 13, the holding mechanism 1 of the ball screw polishing apparatus described above includes a body 1a, a holding base 1b, a chuck 1c, and a center-pressing base 1d. The holding base 1b is erected on the body 1a. The chuck 1c is provided on the holding base 1b. The chuck 1c is adapted to detachably hold one end of the screw shaft W. The center-pressing base 1d is adapted to rotatably hold the other end of the screw shaft W.

As shown in FIG. 12, the rotating mechanism 2 of the ball screw polishing apparatus described above includes a rotation control motor 2a. The rotation control motor 2a rotates the chuck 1c, which in turn rotates the screw shaft W about the screw axis $W_1$.

Figure 17:
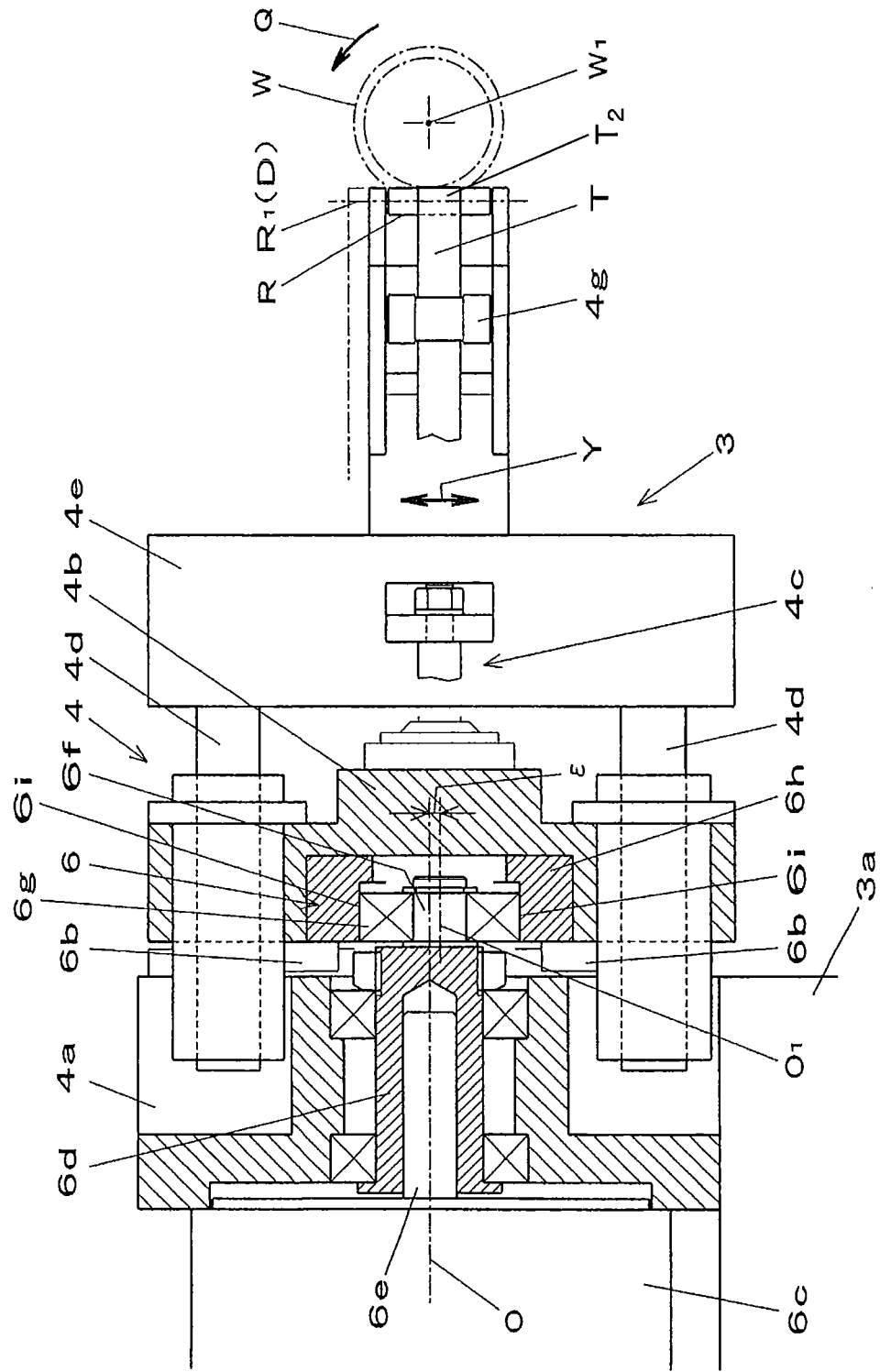
FIG. 17 is an enlarged cross-sectional side view of the ball screw polishing apparatus according to the second embodiment of the present invention.

As shown in FIGS. 12, 13, 14, 15, and 16, the tape-conveying mechanism 3 of the ball screw polishing apparatus described above includes a mounting base 3a, a pair of support shafts 3b, a loaded reel 3c, an empty reel 3d, a payout motor 3e, a take-up motor 3f, a pair of conveying motors 3g, a pair of conveying rollers 3h, and a pair of pinch rollers 3i. The support shafts 3b are disposed on the mounting base 3a. The loaded reel 3c and the empty reel 3d are rotatably mounted on respective support shafts 3b. The loaded reel 3c is wound with unused polishing tape T to be paid out, while the empty reel 3d is configured to rewind the used polishing tape T. The polishing tape T paid out from the loaded reel 3c passes around the outer peripheral surface of the pressing roller R on the tape-pressing mechanism 4 and then is taken up by the empty reel 3d. The payout motor 3e rotates the loaded reel 3c to let out polishing tape T from the loaded reel 3c, while the take-up motor 3f rotates the empty reel 3d to wind the polishing tape T on the empty reel 3d. The conveying motors 3g rotate respective conveying rollers 3h for conveying the polishing tape T between the loaded reel 3c and the pressing roller R and between the pressing roller R and the empty reel 3d. The polishing tape T has a polishing portion $T_2$ traveled around the pressing roller R as shown in FIGS. 16 and 17. That is, the screw groove B is polished by the polishing portion $T_2$ of the polishing tape T which is intermittently or continuously conveyed by the tape-conveying mechanism 3.

The pinch rollers 3*i* are disposed in confrontation with respective conveying rollers 3*h* for pressing the polishing tape T against the conveying rollers 3*h*. Through the associated operations of the payout motor 3*e*, the take-up motor 3*f*, and the conveying motors 3*g*, the tape-conveying mechanism 3 conveys polishing tape T either continuously or intermittently at a relatively slow speed along the conveying path $T_1$ from the loaded reel 3*c*, around the pressing roller R, and to the empty reel 3*d*.

As shown in FIGS. 15 and 16, the tape-pressing mechanism 4 of the ball screw polishing apparatus described above includes a mount 4*a*, a pressing base 4*b*, a pair of left and right cylindrical mechanisms 4*c*, a pair of guide shafts 4*d*, an advancing/retracting member 4*e*, a pair of left and right guide rollers 4*f*, and a pair of left and right guide rollers 4*g*. The mount 4*a* is erected on the mounting base 3*a* described above. The pressing base 4*b* is connected to the mount 4*a*, with the linear oscillating mechanism 6 described above interposed therebetween. Each of the cylindrical mechanisms 4*c* is laterally arranged with a gap therebetween as shown in FIG. 5, and each of the guide shafts 4*d* is vertically arranged with a gap therebetween as shown in FIG. 6. The advancing/retracting member 4*e* is connected to the pressing base 4*b* via the cylindrical mechanisms 4*c* and the guide shafts 4*d*. The guide rollers 4*f* are provided on the pressing base 4*b*, and the guide rollers 4*g* are provided on the advancing/retracting member 4*e*. The pressing roller R described above is disposed in a position rearward (the screw shaft W side) and between the left and right guide rollers 4*g*. The guide rollers 4*f*, the guide rollers 4*g*, and the pressing roller R are configured to guide the polishing tape T as the polishing tape T moves from the tape-conveying mechanism 3, around the pressing roller R, and then back to the tape-conveying mechanism 3 while the cylindrical mechanisms 4*c* presses the polishing tape T on the outer peripheral surface of the pressing roller R against the screw groove B formed in the screw shaft W.

The polishing tape T of the preferred embodiment is configured of a base material coated with abrasive particles of a prescribed size or has such particles bonded to surface thereof. The base material may be formed of polyester film, metal, cloth or the like, for example. The abrasive particles may be formed of aluminum oxide, chromium oxide, silicon carbide, diamond or the like, for example.

Figure 18:
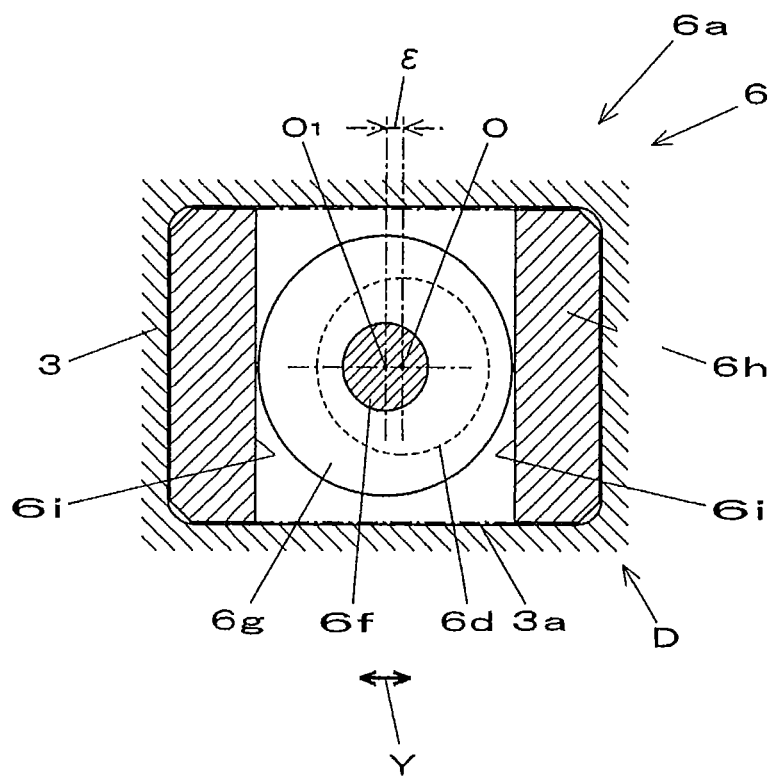
FIG. 18 is an enlarged cross-sectional rear view showing a linear oscillating mechanism of the ball screw polishing apparatus according to the second embodiment of the present invention.
Figure 19:
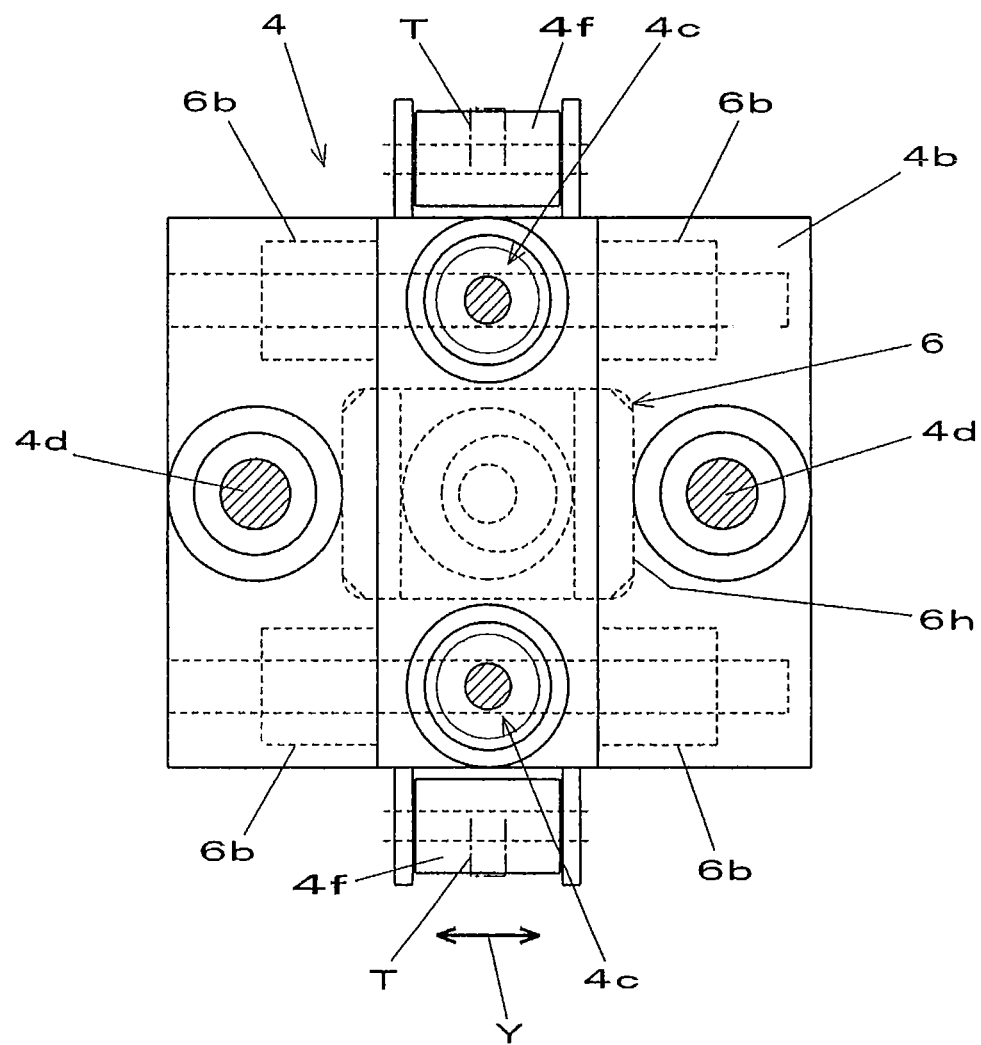
FIG. 19 is an enlarged cross-sectional rear view showing a tape-pressing mechanism of the ball screw polishing apparatus according to the second embodiment of the present invention.

As shown in FIGS. 16, 17, 18, and 19, the linear oscillating mechanism 6 in the ball screw polishing apparatus described above includes an eccentric mechanism 6*a* as shown in FIG. 18, sliding parts 6*b*, a linear oscillation motor 6*c*, and a shaft cylinder 6*d*. The eccentric mechanism 6*a* further includes an eccentric shaft part 6*f*, an eccentric wheel 6*g*, and a steel member 6*h*. The pressing base 4*b* is slidably disposed on the mount 4*a* through the sliding parts 6*b* and, through the operation of the eccentric mechanism 6*a*, can slidingly oscillate in a vertical direction crossing the screw axis $W_1$ of the screw shaft W. The linear oscillation motor 6*c* is mounted on the mount 4*a* and has a main shaft 6*e* rotating about a rotational axis O. The shaft cylinder 6*d* is rotatably supported on the mount 4*a*. The main shaft 6*e* of the linear oscillation motor 6*c* is mounted in the shaft cylinder 6*d*. The eccentric shaft part 6*f* is formed on the shaft cylinder 6*d*. The eccentric shaft part 6*f* has an eccentric axis $O_1$ having an eccentricity relative to the rotational axis O of the main shaft 6*e*, as shown in FIG. 17. The eccentric wheel 6*g* has a ball bearing structure that allows the eccentric shaft part 6*f* to be rotatable relative to the steel member 6*h*. As shown in FIG. 18, the steel member 6*h* is provided in the pressing base 4*b* and formed with a groove extending laterally and passing through the entire center region thereof so as to form flange-like parts on either side of the groove. The flange-like parts have inner surfaces as opposing contact surfaces 6*i* for contacting the eccentric wheel 6*g*. Specifically, the eccentric wheel 6*g* has a diameter substantially the same as a distance between the contact surfaces 6*i* while the diameter of the eccentric wheel 6*g* is smaller than a width of the steel member 6*h* in a direction orthogonal to the directions Y, allowing the linear oscillating mechanism 6 to oscillate in the directions Y, i.e., in the vertical direction. When driven by the linear oscillation motor 6*c*, the eccentric shaft part 6*f*, the eccentric wheel 6*g*, the contact surfaces 6*i* of the steel member 6*h*, and the sliding parts 6*b* are configured to oscillate the pressing roller R linearly in the directions Y parallel to the rotational axis $R_1$.

As shown in FIGS. 12 and 13, the moving mechanism 8 of the ball screw polishing apparatus described above includes a stationary base 8*a*, rails 8*b*, a sliding plate 8*c*, a ball screw mechanism 8*f*, and a movement control motor 8*g*. The stationary base 8*a* is disposed on the body 1*a*. The rails 8*b* are vertically in confrontation with the stationary base 8*a* and extend along the ball screw mechanism 8*f*. The sliding plate 8*c* is disposed on the rails 8*b* and slidingly movable on the rails 8*b* in a direction parallel to the screw axis $W_1$ of the screw shaft W. The mounting base 3*a* of the tape-conveying mechanism 3 is disposed on the sliding plate 8*c* with the tilting mechanism 5 and pivotal oscillating mechanism 7 interposed therebetween. The ball screw mechanism 8*f* includes a screw shaft 8*d*, and a nut 8*e* provided on the screw shaft 8*d*. Through the ball screw mechanism 8*f*, the movement control motor 8*g* moves the sliding plate 8*c*, and consequently the polishing tape T at the moving speed F, in a direction parallel to the screw axis $W_1$ of the screw shaft W.

Figure 20:
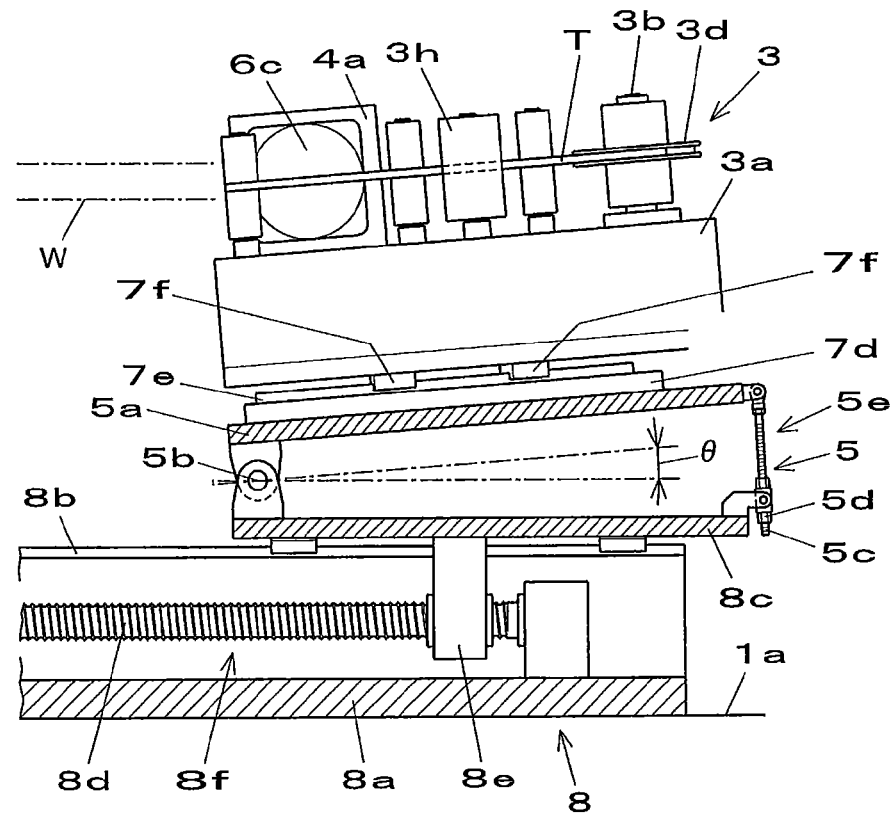
FIG. 20 is a partial cross-sectional front view of the ball screw polishing apparatus according to the second embodiment of the present invention.
Figure 21:
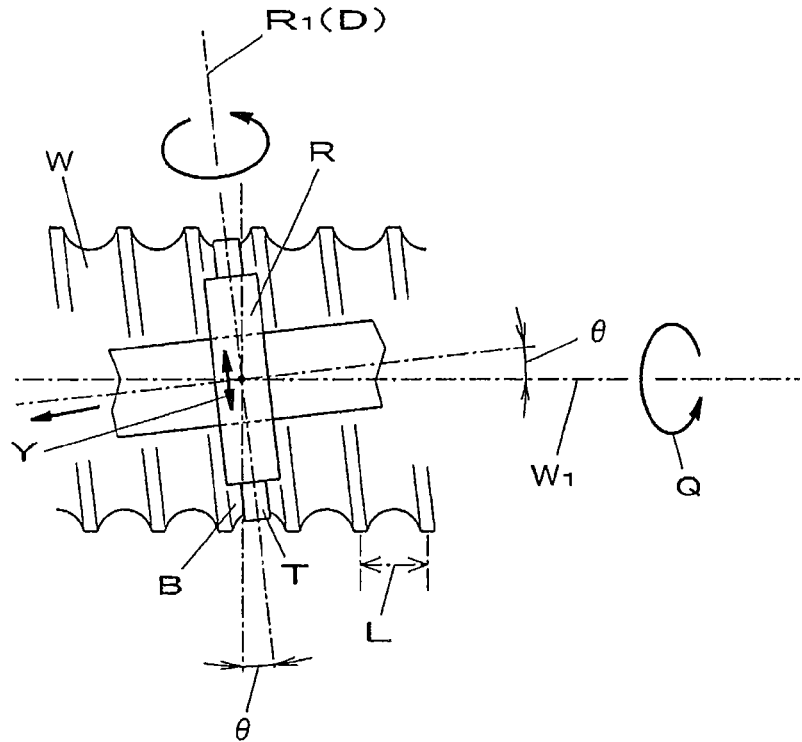
FIG. 21 is an enlarged partial front view illustrating a polishing mechanism of the ball screw polishing apparatus according to the second embodiment of the present invention.
Figure 22:
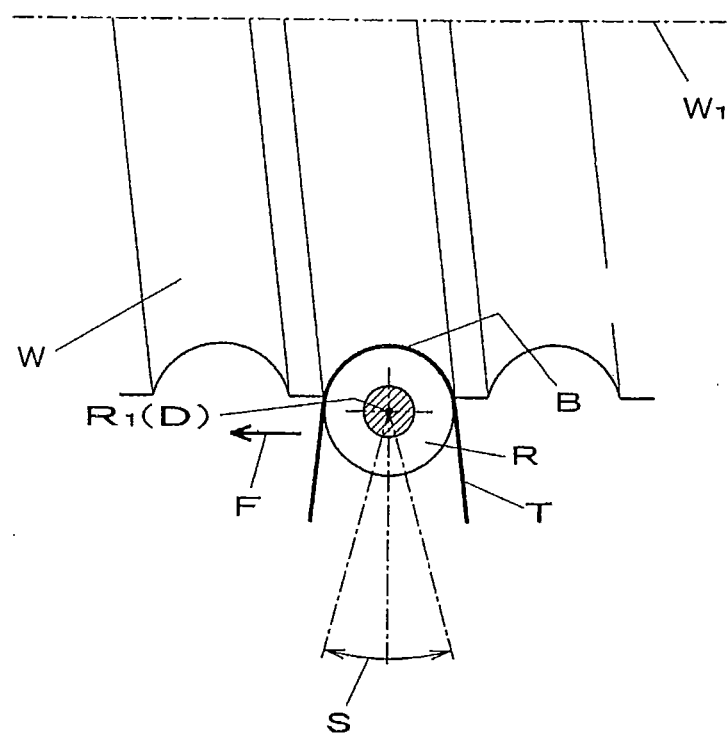
FIG. 22 is an enlarged partial plan view illustrating the polishing mechanism of the ball screw polishing apparatus according to the second embodiment of the present invention.

As shown in FIGS. 12, 13, 20, and 21, the tilting mechanism 5 includes a tilting base 5*a*, a pivot shaft 5*b*, and a position-fixing mechanism 5*e*. The tilting base 5*a* is pivotably disposed on the sliding plate 8*c* by the pivot shaft 5*b*, enabling the tilting base 5*a* to be tilted relative to the screw axis $W_1$ of the screw shaft W. The position-fixing mechanism 5*e* further includes a connecting screw 5*c* and a fixing nut 5*d* disposed on the opposite side of the tilting base 5*a* from the pivot shaft 5*b* for fixing the tilting base 5*a* in the tilted position thereof, that is, that is, the tilting base 5*a* has a one end portion provided with the position-fixing mechanism 5*e* and the other end portion provided with the pivot shaft 5*b* as shown in FIG. 20. The pressing roller R is disposed on the tilting base 5*a* through the tape-conveying mechanism 3 and tape-pressing mechanism 4. The tilting mechanism 5 is configured to tilt the pressing roller R such that the rotational axis $R_1$ of the pressing roller R corresponds to the lead angle θ of the screw groove B as shown in FIGS. 20 and 21. That is, the tilting mechanism 5 tilts the pressing roller R such that the rotational axis $R_1$ is in alignment with the lead angle θ, efficiently polishing the screw groove B by the polishing portion $T_2$. The lead angle θ is defined by a vertical straight line and a straight line along the screw groove B.

As shown in FIGS. 14, 15, and 21, the pivotal oscillating mechanism 7 includes a pivotal drive unit 7*c*, an arc-shaped pivotal oscillation base 7*d*, an arc-shaped guide rail 7*e*, sliding parts 7*f*, a pivotal shaft 7*g*, a bearing member 7*h*, and a pivotal oscillation motor 7*i*. The pivotal drive unit 7*c* includes a pivotal guide part 7*a* for guiding pivotal oscillation of the pressing roller R about the rotational axis $R_1$, and a worm gear mechanism 7*b* for oscillating the pressing roller R about the rotational axis $R_1$. The pivotal oscillation base 7*d* is mounted on the tilting base 5*a* described above. The guide rail 7*e* is mounted on the pivotal oscillation base 7*d* such that an arc center of the guide rail 7*e* is aligned with the rotational axis $R_1$ of the pressing roller R. The sliding parts 7*f* are assembled on the bottom of the mounting base 3a and slidably mounted on the guide rail 7e. The pivotal shaft 7g is vertically oriented in the tilting base 5a and has an axis D in vertical alignment with the rotational axis $R_1$. The pivotal shaft 7g is rotatably supported by the bearing member 7h. The mounting base 3a has a protruding portion on which the top of the pivotal shaft 7g is mounted. The pivotal oscillation motor 7i is mounted on the tilting base 5a. The worm gear mechanism 7b is interposed between a main shaft of the pivotal oscillation motor 7i and a bottom of the pivotal shaft 7g. When driven by the pivotal oscillation motor 7i, the pivotal drive unit 7c having the pivotal guide part 7a and the worm gear mechanism 7b described above pivotally oscillates the pressing roller R about the rotational axis $R_1$ within the angular range S as shown in a chain line of FIG. 15. That is, the pressing roller R is pivotally oscillated about the rotational axis $R_1$ in clockwise and counterclockwise directions in a plan view.

The speed-synchronizing mechanism 9 includes the rotation control motor 2a that rotates the screw shaft W, the movement control motor 8g that moves the polishing tape T, i.e., the movement control motor 8g moves the tape-conveying mechanism 3 along with the tilting mechanism 5 so as to move the polishing tape T in a direction parallel to the screw axis $W_1$ by rotating the screw shaft 8d, and a synchronization control unit 9a adapted to synchronize the rotational speed Q of the rotation control motor 2a with the rotational speed of the movement control motor 8g. While a detailed circuit structure and the like for the synchronization control unit 9a has been omitted from the drawings, the synchronization control unit 9a may be a personal computer and the like, for example, for synchronizing the rotational speed Q of the screw shaft W with the moving speed F of the polishing tape T based on the lead L of the screw groove B. That is, the synchronization control unit 9a is adapted to control the rotation control motor 2a and the movement control motor 8a such that the polishing tape T on the pressing roller R moves at the moving speed F along the screw groove B in a direction parallel to the screw axis $W_1$ while rotating the screw shaft W at the rotational speed Q. Specifically, the synchronizing mechanism 9 synchronizes the rotational speed of the rotation control motor 2a with the rotational speed of the movement control motor 8g.

Next, the polishing operation will be described. With the ball screw polishing apparatus according to the second embodiment described above, and as shown in FIGS. 12, 13, 16, 21, and 22, the holding mechanism 1 rotatably holds the screw shaft W of the ball screw, while the rotating mechanism 2 rotates the screw shaft W about the screw axis $W_1$. At this time, the tape-conveying mechanism 3 conveys the polishing tape T along the conveying path $T_1$. The tape-pressing mechanism 4 guides the polishing tape T out from the tape-conveying mechanism 3, around the peripheral surface of the pressing roller R, and back to the tape-conveying mechanism 3 while pressing the polishing tape T on the outer peripheral surface of the pressing roller R against the screw groove B formed in the screw shaft W. The tilting mechanism 5 holds the pressing roller R in a tilted state such that the rotational axis $R_1$ of the pressing roller R is aligned with the lead angle θ of the screw groove B. The linear oscillating mechanism 6 oscillates the pressing roller R together with the polishing tape T thereon linearly in the directions Y parallel to the rotational axis $R_1$. The pivotal oscillating mechanism 7 oscillates the pressing roller R about the rotational axis $R_1$ within the angular range S. The moving mechanism 8 moves the polishing tape T in a direction parallel to the screw axis $W_1$ of the screw shaft W at the moving speed F. The speed-synchronizing mechanism 9 synchronizes the rotational speed Q of the screw shaft W with the moving speed F of the polishing tape T based on the lead L of the screw groove B. In this way, the polishing tape T can polish the screw groove B through a combination of operations that include: rotation of the screw shaft W by the rotating mechanism 2; conveyance of the polishing tape T by the moving mechanism 8 along the conveying path $T_1$ by the tape-conveying mechanism 3; linear oscillation of the polishing tape T in the directions Y by the linear oscillating mechanism 6; pivotal oscillation of the pressing roller R within the angular range S by the pivotal oscillating mechanism 7; and linear movement of the polishing tape T along the screw axis $W_1$ of the screw shaft W at the moving speed F synchronized with the rotational speed Q of the screw shaft W. By moving the polishing tape T along the screw axis $W_I$ in synchronization with the rotational speed Q of the screw shaft W, the movement of the polishing tape T matches the lead L of the screw groove B so that the tape-pressing mechanism 4 can reliably press the polishing tape T on the pressing roller R against the screw groove B and can reliably polish the screw groove B through continuous or intermittent conveyance along the conveying path $T_1$, linear oscillation in the directions Y, and pivotal oscillation of the pressing roller R within the angular range S. Thus, the method and apparatus of the first embodiment can improve polishing precision, can reduce surface roughness in the screw groove B, and can improve polishing efficiency for the screw groove B.

Further, by using the eccentric mechanism 6a to oscillate the pressing roller R linearly in the directions Y aligned with the rotational axis $R_1$ of the pressing roller R, the structure of the linear oscillating mechanism 6 can be simplified. Further, by providing the pivotal oscillating mechanism 7 with the pivotal drive unit 7c having the pivotal guide part 7a for guiding pivotal oscillation of the pressing roller R about the rotational axis $R_1$, and the worm gear mechanism 7b for oscillating the pressing roller R about the rotational axis $R_1$, the structure of the pivotal oscillating mechanism 7 can be simplified. Further, by configuring the speed-synchronizing mechanism 9 of the rotation control motor 2a for rotating the screw shaft W, the movement control motor 8g for moving the polishing tape T along the screw axis $W_1$ of the screw shaft W, and the synchronization control unit 9a for controlling synchronization of the rotational speed Q of the rotation control motor 2a and the rotational speed of the movement control motor 8g, the speed-synchronizing mechanism 9 can synchronize the rotational speed Q of the screw shaft W with the moving speed F of the polishing tape T based on the lead L of the screw groove B. Thus, the above structure can match the movement of the polishing tape T with the lead L of the screw groove B so that the polishing tape T reliably contacts the screw groove B, while simplifying the structure of the ball screw polishing apparatus and improving the polishing precision.

While the invention has been described in detail with reference to specific embodiments thereof, it would be apparent to those skilled in the art that many modifications and variations may be made to the holding mechanism 1, the rotating mechanism 2, the tape-conveying mechanism 3, the tape-pressing mechanism 4, the tilting mechanism 5, the linear oscillating mechanism 6, the pivotal oscillating mechanism 7, the moving mechanism 8, and the speed-synchronizing mechanism 9 without departing from the spirit of the invention, the scope of which is defined by the attached claims.

For example, while the ball screw polishing apparatus in the preferred embodiments described above is configured to perform dry polishing, the present invention is not limited to this configuration. The present invention may be applied to an apparatus configured to perform wet polishing by supplying a lubricant or machining fluid that includes chemicals and loose abrasives formed of any of various materials between the screw groove B of the screw shaft W and the polishing tape T. In addition, the speed-synchronizing mechanism 9 may be configured of a mechanical rotation-synchronizing mechanism similar to a change gear mechanism used for the lead screw of a lathe, or may be designed to suit the type of screw shaft W and the polishing conditions.

As described above, the method and apparatus of the present invention for polishing a ball screw is capable of producing suitable surface roughness in the screw groove of the screw shaft.

What is claimed is:

1. A method for polishing a ball screw comprising a screw shaft defining a screw axis, the screw shaft being formed with a screw groove having a lead and a lead angle, the method comprising the steps of:
    holding the screw shaft rotatably;
    rotating the screw shaft at a rotational speed about the screw axis;
    conveying a polishing tape continuously or intermittently, the polishing tape having a polishing portion traveled around an outer peripheral surface of a pressing roller, the press roller being configured to rotate about a rotational axis;
    guiding the polishing tape such that the polishing portion is traveled around the outer peripheral surface;
    pressing the polishing portion against the screw groove;
    tilting the pressing roller such that the rotational axis is aligned with the lead angle;
    oscillating the pressing roller linearly along the rotational axis;
    moving the polishing tape at a moving speed in a direction parallel to the screw axis; and
    synchronizing the rotational speed with the moving speed based on the lead.

2. The method according to claim 1, further comprising the steps of oscillating the pressing roller pivotally about the rotational axis.

3. A ball screw polishing apparatus for polishing a ball screw comprising a screw shaft defining a screw axis, the screw shaft being formed with a screw groove having a lead and a lead angle, the ball screw polishing apparatus comprising:
    a holding mechanism configured to rotatably hold the screw shaft;
    a rotating mechanism configured to rotate the screw shaft at a rotational speed about the screw axis;
    a pressing roller configured to rotate about a rotational axis and having an outer peripheral surface;
    a tape-conveying mechanism configured to continuously or intermittently convey a polishing tape, the polishing tape having a polishing portion traveled around the outer peripheral surface;
    a tape-pressing mechanism configured to guide the polishing tape such that the polishing portion is traveled around the outer peripheral surface and press the polishing portion against the screw groove;
    a tilting mechanism configured to tilt the pressing roller such that the rotational axis is aligned with the lead angle;
    a linear oscillating mechanism configured to linearly oscillate the pressing roller along the rotational axis;
    a moving mechanism configured to move the polishing tape at a moving speed in a direction parallel to the screw axis; and
    a speed-synchronizing mechanism configured to synchronize the rotational speed with the moving speed based on the lead.

4. The ball screw polishing apparatus according to claim 3, further comprising a pivotal oscillating mechanism configured to pivotally oscillate the pressing roller about the rotational axis.

5. The ball screw polishing apparatus according to claim 4, wherein the pivotal oscillating mechanism comprising:
    a pivotal guide configured to guide a pivotal oscillation of the pressing roller about the rotational axis; and
    a worm gear mechanism configured to pivotally oscillate the pressing roller about the rotational axis.

6. The ball screw polishing apparatus according to claim 3, wherein the linear oscillating mechanism comprises an eccentric mechanism configured to oscillate the pressing roller linearly in the rotational axis.

7. The ball screw polishing apparatus according to claim 3, wherein the speed-synchronizing mechanism comprises:
    a first motor configured to rotate the screw shaft;
    a second motor configured to move the polishing tape in the direction parallel to the screw axis; and
    a synchronization controller configured to control the first motor and the second motor to synchronize a rotational speed of the first motor with a rotational speed of the second motor.

* * * * *